US012581387B2

(12) United States Patent
Bisht et al.

(10) Patent No.: US 12,581,387 B2
(45) Date of Patent: Mar. 17, 2026

(54) SYSTEM AND METHOD FOR HYBRID ROUTING IN 5G NETWORKS

(71) Applicant: JIO PLATFORMS LIMITED, Ahmedabad (IN)

(72) Inventors: Sandeep Bisht, Kalyan (IN); Ezaj Ahmed Ansari, Darjeeling (IN); Ravindra Kumar Yadav, Orai (IN); Aayush Bhatnagar, Navi Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 403 days.

(21) Appl. No.: 18/029,685

(22) PCT Filed: Mar. 24, 2023

(86) PCT No.: PCT/IB2023/052936
§ 371 (c)(1),
(2) Date: Mar. 31, 2023

(87) PCT Pub. No.: WO2023/187582
PCT Pub. Date: Oct. 5, 2023

(65) Prior Publication Data
US 2025/0088936 A1    Mar. 13, 2025

(30) Foreign Application Priority Data

Mar. 31, 2022    (IN) .............................. 202221019790

(51) Int. Cl.
*H04W 40/00*        (2009.01)
*H04W 40/32*        (2009.01)
*H04W 84/04*        (2009.01)
(52) U.S. Cl.
CPC ......... *H04W 40/005* (2013.01); *H04W 40/32* (2013.01); *H04W 84/042* (2013.01)

(58) Field of Classification Search
CPC ..... H04W 48/18; H04W 24/04; H04W 76/18; H04W 8/02; H04W 60/04; H04W 48/02;
(Continued)

(56) References Cited

U.S. PATENT DOCUMENTS 11,564,154 B2 * 1/2023 Belling ................. H04W 48/16
11,856,423 B2 * 12/2023 Kim ...................... H04W 48/02
(Continued)

OTHER PUBLICATIONS

Ravi Shekhar et al., "Consumer NF Authentication and Service Authorization Using an SCP for an ESBA Based 5G Core Network", Technical Disclosure Commons, Sep. 14, 2020, Total pp. 08.
(Continued)

*Primary Examiner* — Jung Liu
(74) *Attorney, Agent, or Firm* — FINNEGAN, HENDERSON, FARABOW, GARRETT & DUNNER, LLP

(57) ABSTRACT

The present disclosure pertains to a system that enables hybrid routing with active and standby instances. A request from sites apart from Nagpur site is obtained at 702, and that from Nagpur site is obtained at 706. Then, it is checked at 704, whether any endpoint is active. If so, the request is transmitted to primary cluster 710. However, if no endpoint is active, then at 708, it is checked whether the request is from the Nagpur. If so, then it is checked again, at 712, whether any endpoint is active. However, in case it is found, at the 708, the request is not from Nagpur, then it is fed to Nagpur DR cluster 720. Further, at the 712, if any endpoint is active, then the request is transmitted to Nagpur active cluster 730, but, if no endpoint is active, then the request is fed to DR for Nagpur 740.

22 Claims, 15 Drawing Sheets

(58) Field of Classification Search
CPC . H04W 8/18; H04W 36/1443; H04W 84/042; H04W 48/16; H04L 67/51; H04M 15/66
See application file for complete search history.

(56) References Cited

U.S. PATENT DOCUMENTS

| | | | | |
|---|---|---|---|---|
| 11,864,099 | B2 * | 1/2024 | Kadalbal | H04L 67/51 |
| 11,930,397 | B2 * | 3/2024 | Park | H04W 76/15 |
| 12,262,295 | B2 * | 3/2025 | Kim | H04L 69/40 |
| 2010/0271934 | A1 * | 10/2010 | Holliday | H04L 45/28 370/216 |
| 2018/0132118 | A1 * | 5/2018 | Nekovee | H04L 47/2425 |
| 2021/0297935 | A1 * | 9/2021 | Belling | H04W 40/00 |
| 2021/0367916 | A1 * | 11/2021 | Belling | H04L 67/51 |
| 2022/0110082 | A1 * | 4/2022 | Belling | H04W 8/005 |
| 2022/0182854 | A1 * | 6/2022 | Kim | H04W 48/18 |
| 2022/0217522 | A1 * | 7/2022 | Kim | H04W 8/02 |
| 2022/0312196 | A1 * | 9/2022 | Guo | H04L 63/065 |
| 2023/0128078 | A1 * | 4/2023 | Kadalbal | H04L 67/51 370/329 |
| 2024/0107437 | A1 * | 3/2024 | Kadalbal | H04W 48/18 |
| 2024/0381407 | A1 * | 11/2024 | Yu | H04B 7/0695 |
| 2024/0406717 | A1 * | 12/2024 | Gundavelli | H04L 61/4511 |
| 2024/0422660 | A1 * | 12/2024 | Bartolome Rodrigo | H04W 48/18 |

OTHER PUBLICATIONS

International Search Report, PCT/IB2023/052936, mailed Jul. 27, 2023, Total pp. 03.

* cited by examiner 100-1

100-2

300-1

300-2

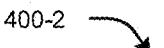
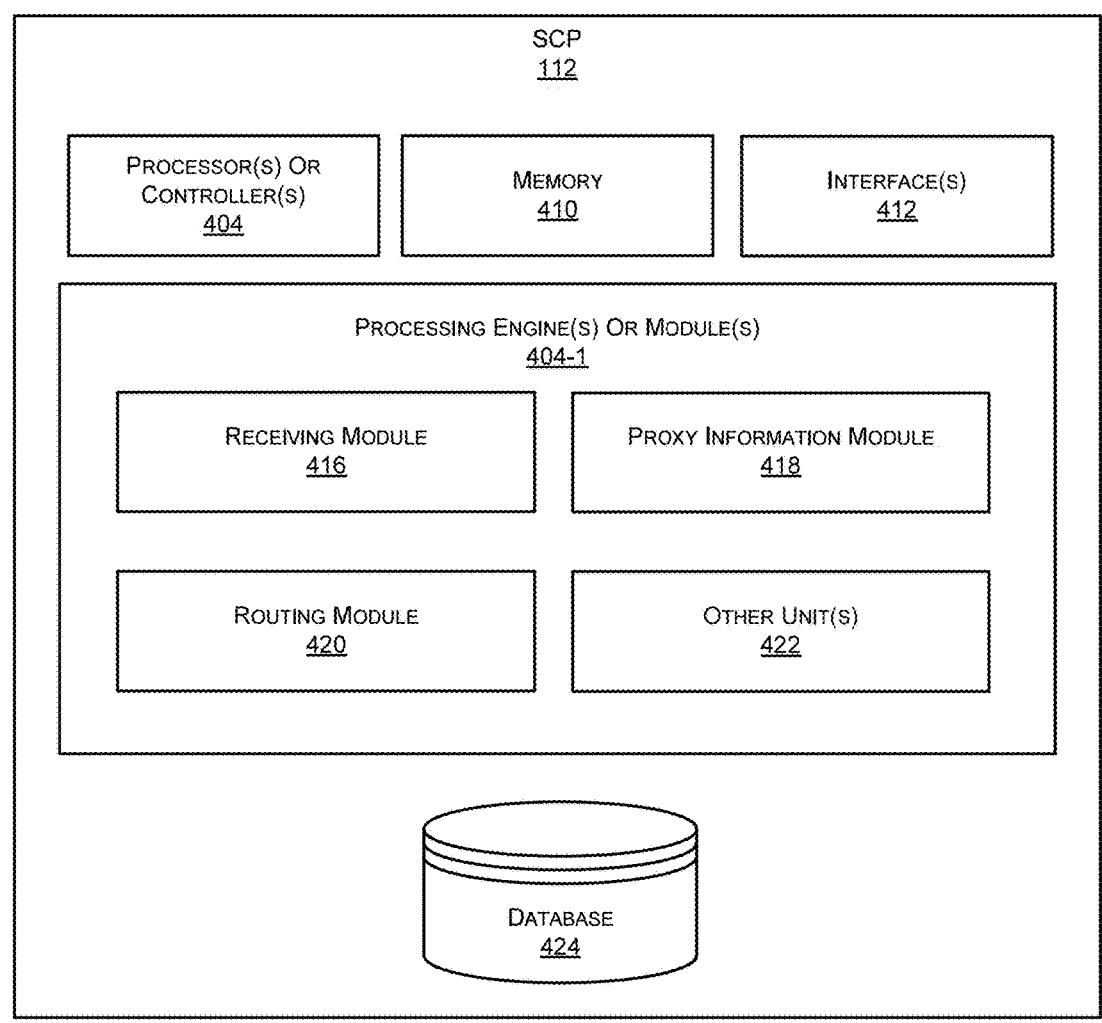
FIG. 4B

1000

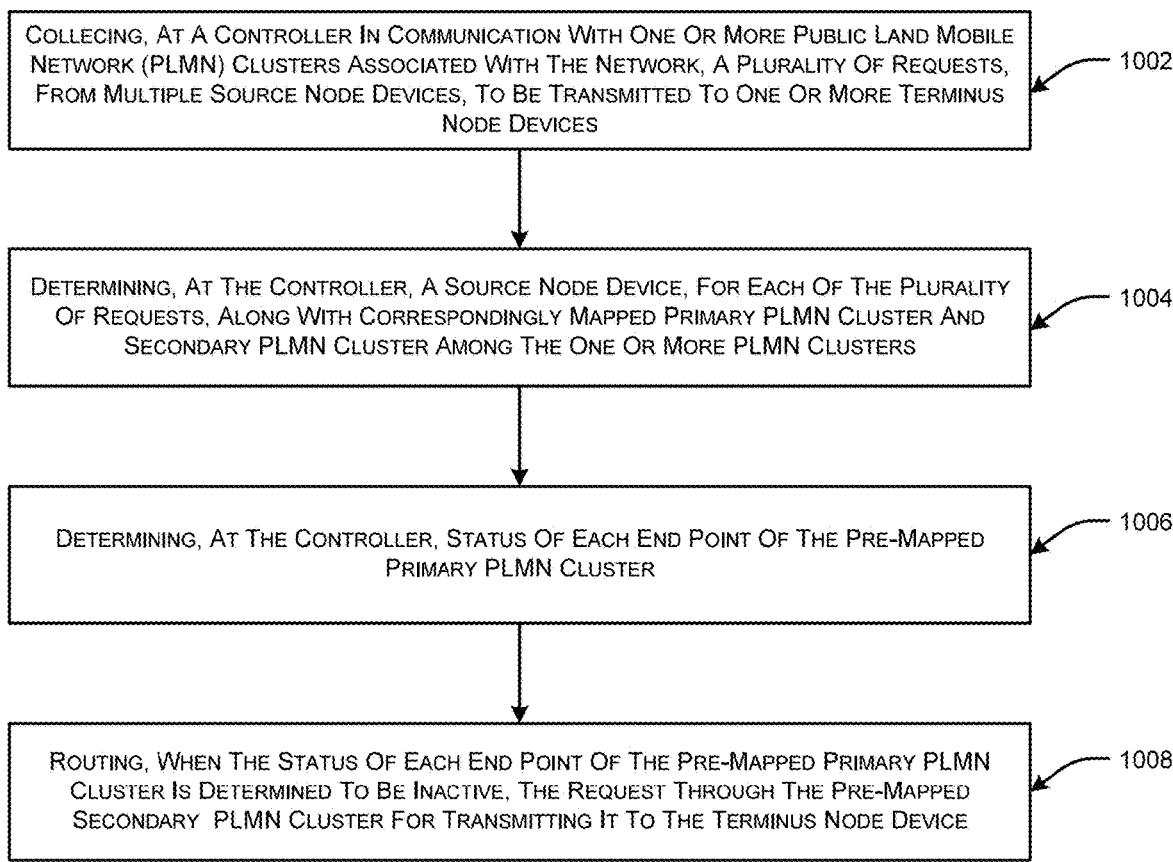

COLLECING, AT A CONTROLLER IN COMMUNICATION WITH ONE OR MORE PUBLIC LAND MOBILE NETWORK (PLMN) CLUSTERS ASSOCIATED WITH THE NETWORK, A PLURALITY OF REQUESTS, FROM MULTIPLE SOURCE NODE DEVICES, TO BE TRANSMITTED TO ONE OR MORE TERMINUS NODE DEVICES — 1002

DETERMINING, AT THE CONTROLLER, A SOURCE NODE DEVICE, FOR EACH OF THE PLURALITY OF REQUESTS, ALONG WITH CORRESPONDINGLY MAPPED PRIMARY PLMN CLUSTER AND SECONDARY PLMN CLUSTER AMONG THE ONE OR MORE PLMN CLUSTERS — 1004

DETERMINING, AT THE CONTROLLER, STATUS OF EACH END POINT OF THE PRE-MAPPED PRIMARY PLMN CLUSTER — 1006

ROUTING, WHEN THE STATUS OF EACH END POINT OF THE PRE-MAPPED PRIMARY PLMN CLUSTER IS DETERMINED TO BE INACTIVE, THE REQUEST THROUGH THE PRE-MAPPED SECONDARY PLMN CLUSTER FOR TRANSMITTING IT TO THE TERMINUS NODE DEVICE — 1008

FIG. 10

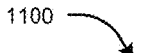
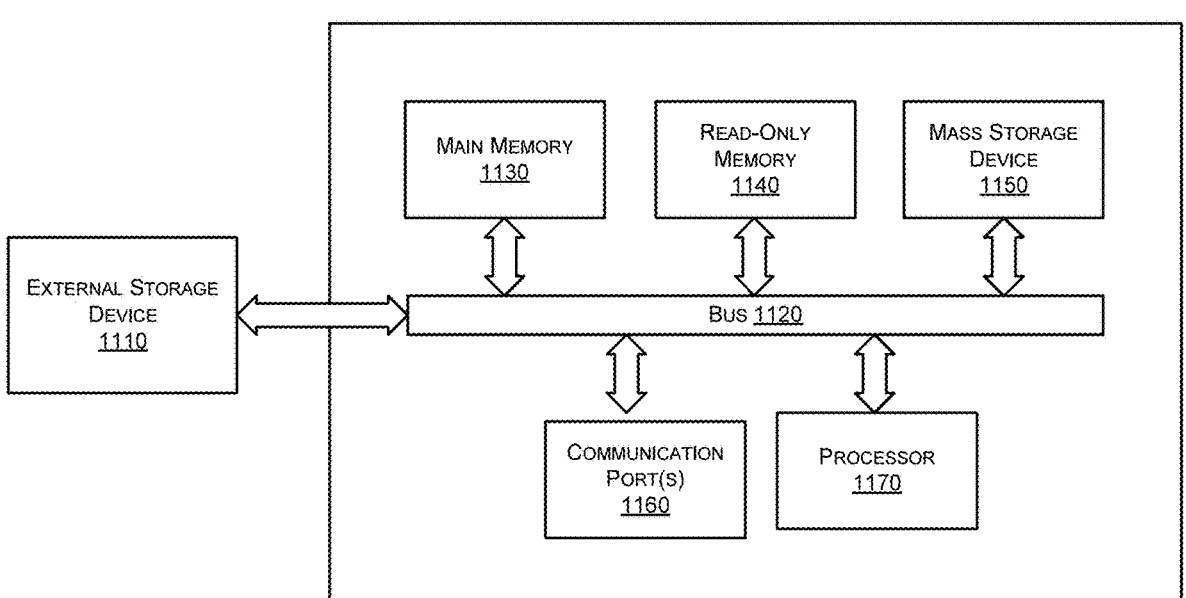
FIG. 11

SYSTEM AND METHOD FOR HYBRID ROUTING IN 5G NETWORKS

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The patent document includes systems and methods as defined in 3GPP Technical Specification (TS) 3GPP TS 29.203, 3GPP TS 29.212, 3GPP TS 29.213, 3GPP TS 29.214, 3GPP TS 29.272, and the like.

FIELD OF INVENTION

The present invention relates generally to the field of routing, and more particularly, to next-generation network techniques that enable hybrid routing, with active as well as some standby instances, in next-generation networks such as 5G networks or hybrid/integrated systems involving 4G, 5G, and/or 6G.

BACKGROUND OF THE INVENTION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of prior art.

Availability of fast and uninterrupted communication facilities has become imperative in today's high-tech world. Many communication devices such as smart phones, laptops, tablets, and the like, are there in the market for contending with the requirement of fast and uninterrupted communication facilities. These communication devices can be connected through various wired and wireless network technologies.

However, usage and number of communication devices are increasing day by day at an exponential rate, which has resulted in increased complexity of the existing networks. This may lead to poor service quality, security, and efficiency in the current communication networks. In such a scenario, a router acts as a primary control point, which aids in easing out the increasing complexities of the networks, provides reliable service quality and security, facilitates monitoring and improvement in efficiency, and other attributes that allow networks to add value. Therefore, by controlling a router one can control, to a great extent, the corresponding network.

In general, routing can be defined as a mechanism of selecting a specific path in a network or between or across multiple networks for transmitting data quickly between a first communication device and a second communication device, which may be located remotely from each other. Routing can be performed on various networks including circuit-switched networks, for instance, public switched telephone network (PSTN), as well as computer networks, for instance, Internet.

In the routing process, routing tables are frequently used to direct the forwarding of data packets. Routing tables keep track of the paths to different network destinations. Routing tables can be created with the use of routing protocols, learned from network traffic, or may be provided by an administrator.

In general, next-generation based architecture, such as, 5G service-based architecture is designed in a way that all Network Functions are closely interconnected. These Network Functions may possess the ability to discover the peer nodes and transmit network information among the nodes. This approach is bound to create a spaghetti of interconnections between several user devices, such as laptop, smartphone, tablet, and the like, connected through a network, which can hamper the flow of data between said user devices or may lead to loss of data. In certain scenarios, it may also lead to misplacement of data which is highly undesirable.

Conventional systems and methods are configured within a network that consists of several nodes, each having a distinct deployment scenario/architecture and functionality. Routing algorithms in the conventional systems and methods cannot manage distinct deployment scenarios/architectures and functionality of each node. Hence the establishment of a communication channel between the nodes may get affected, which may, in turn, adversely affect the flow of data in the network.

In addition, current systems and methods or routing techniques are unable to process a request related to the transmission of data that corresponds to a node which is down/unavailable.

Hence, there is a need to provide a routing solution, which can optimize a data path of the information exchanged between user devices, and can resolve various network-related issues as mentioned above.

OBJECTS OF THE PRESENT DISCLOSURE

An object of the present disclosure is to provide a system and method facilitating the management of traffic pertaining to incoming requests by enabling effective and improved routing of the traffic.

Another object of the present disclosure is to provide a system and method that may be agnostic to architecture, structure, functionality of each node, and implementation of Network Functions.

Another object of the present disclosure is to provide a system and method that facilitates SCP implementation that enables load balancing, routing, traffic monitoring, congestion control, service discovery and other such functions in an effective manner.

An object of the present disclosure is to provide a system and a method for facilitating uninterrupted data transmission traffic.

SUMMARY

According to an aspect, the present disclosure pertains to a system that enables hybrid routing in a network. The system includes a controller comprising one or more processors coupled to a memory storing instructions executable by the one or more processors, wherein the controller is in communication with one or more public land mobile network (PLMN) clusters, a plurality of source node devices, and a terminus node device associated with the network.

Further, the controller is configured to collect, from multiple source node devices in communication with the controller, a plurality of requests to be transmitted to the terminus node device. Furthermore, the controller is configured to determine, for each of the plurality of requests, a source node device along with a correspondingly pre-mapped primary PLMN cluster and secondary PLMN cluster among the one or more PLMN clusters; and then determine status of each end point of the pre-mapped primary PLMN cluster. When the status of each end point of the pre-mapped primary PLMN cluster is determined to be inactive, the controller is configured to route the request through the pre-mapped secondary PLMN cluster for transmitting it to the terminus node device.

In an aspect, the proposed system is agnostic to architecture, structure, functionality of each node, and implementation of Network Functions.

In another aspect, the proposed system may facilitate SCP implementation that enables load balancing, routing, traffic monitoring, congestion control, service discovery and other such functions in an effective manner.

In an aspect, in case a request is determined to be received from a first source node device, the controller may be further configured to select a first PLMN cluster from the one or more PLMN clusters for transmitting said request, and determine status of all endpoints of the first PLMN cluster, wherein the first PLMN cluster may be a pre-mapped primary PLMN cluster for the first source node device. When status of all the endpoints of the first PLMN cluster is determined to be inactive, the controller may be further configured to select a second PLMN cluster from the one or more PLMN clusters, and route said request to the second PLMN cluster for transmitting said request to the terminus node device. Further, the second PLMN cluster may be a pre-mapped secondary PLMN cluster for the source node device.

In another aspect, the controller may be further configured to transmit said request directly through the first PLMN cluster to the terminus node device, if status of at least one of the endpoints of the first PLMN cluster is determined to be active. Further, when status of more than one end points of any of the first and second PLMN cluster is determined to be active, the controller may be configured to distribute data traffic, pertaining to the requests among the plurality of requests associated with the first source node device, in the network proportionally among the active end points of said PLMN cluster.

In an aspect, the controller may be configured to select a third PLMN cluster from the one or more PLMN clusters for transmitting said request in case a request is determined to be received from a source node device other than the first source node device, wherein the third PLMN cluster may be a pre-mapped primary PLMN cluster for said source node device. Further, the controller may be configured to determine status of all endpoints of the third PLMN cluster, and in case status of all the endpoints of the third PLMN cluster is determined to be inactive, the controller may further be configured to select a fourth PLMN cluster from the one or more PLMN clusters, and route said request from the third PLMN cluster to the fourth PLMN cluster for transmitting said request to the terminus node device, wherein the fourth PLMN cluster may be a pre-mapped secondary PLMN cluster for said source node device.

In one aspect, the controller may be configured to transmit said request directly through the third PLMN cluster to the terminus node device in case status of at least one of the endpoints of the third PLMN cluster is determined to be active. Further, when status of more than one end points of any of the third and fourth PLMN cluster is determined to be active, the controller may further be configured to distribute data traffic, pertaining to the requests among the plurality of requests associated with the source node device other than the first source node device, in the network proportionally among the active end points of said PLMN cluster.

In other aspect, the controller may be configured to divide a single PLMN cluster of the one or more PLMN clusters into two sub-clusters, wherein one of the two sub-clusters acts as the third PLMN cluster and the other sub-cluster acts as the fourth PLMN cluster.

In another aspect, the controller may be configured to facilitate configuration of the one or more PLMN clusters as any of the primary PLMN cluster and the secondary PLMN cluster for multiple source node devices based on mapping of routing tables.

In yet another aspect, the controller may be configured to trigger a negative response corresponding to said request in case status of all the end points of the secondary PLMN cluster is determined to be inactive.

According to another aspect, the present disclosure pertains to a method that enables hybrid routing in a network. The method involves firstly collecting, at a controller in communication with one or more public land mobile network (PLMN) clusters associated with the network, a plurality of requests, from multiple source node devices, to be transmitted to terminus node device. Further, it involves determining, at the controller, a source node device, for each of the plurality of requests, along with correspondingly mapped primary PLMN cluster and secondary PLMN cluster among the one or more PLMN clusters; and then determining, at the controller, status of each end point of the pre-mapped primary PLMN cluster. Moreover, it involves routing, when the status of each end point of the pre-mapped primary PLMN cluster is determined to be inactive, the request through the pre-mapped secondary PLMN cluster for transmitting it to the terminus node device.

In an aspect, in case a request is determined to be received from a first source node device, the method may involve selecting a first PLMN cluster from the one or more PLMN clusters for transmitting said request, and then determining status of all endpoints of the first PLMN cluster, wherein the first PLMN cluster may be a pre-mapped primary PLMN cluster for the first source node device. When status of all the endpoints of the first PLMN cluster is determined to be inactive, the method may involve selecting a second PLMN cluster from the one or more PLMN clusters, and then routing said request from the first PLMN cluster to the second PLMN cluster for transmitting said request to the terminus node device, wherein the second PLMN cluster may be a pre-mapped secondary PLMN cluster for the first PLMN cluster.

In another aspect, if status of at least one of the endpoints of the first PLMN cluster is determined to be active, the method may involve transmitting said request directly through the first PLMN cluster to the terminus node device.

In an aspect, when status of more than one end points of any of the first and second PLMN cluster is determined to be active, the method may involve distributing data traffic, pertaining to the requests among the plurality of requests associated with the first source node device, in the network proportionally among the active end points of said PLMN cluster.

In an aspect, in case a request is determined to be received from a source node device other than the first source node device, the method may involve selecting a third PLMN cluster from the one or more PLMN clusters for transmitting said request, and determining status of all endpoints of the third PLMN cluster, wherein the third PLMN cluster may be pre-mapped primary PLMN cluster for said source node device. When status of all the endpoints of the third PLMN cluster is determined to be inactive, the method may involve selecting a fourth PLMN cluster from the one or more PLMN clusters, and routing said request from the third PLMN cluster to the fourth PLMN cluster for transmitting said request to at least one of the terminus node device, wherein the fourth PLMN cluster may be a pre-mapped secondary PLMN cluster for said source node device.

In another aspect, if status of at least one of the endpoints of the third PLMN cluster is determined to be active, the method may involve transmitting said request directly through the third PLMN cluster to the terminus node device.

In yet another aspect, in case status of all the end points of the secondary PLMN cluster is determined to be inactive, the method may involve triggering a negative response corresponding to said request.

In an aspect, the method may involve dividing a single PLMN cluster into two sub-clusters, wherein one of the two sub-clusters may act as the third PLMN cluster and the other may act as the fourth PLMN cluster.

In another aspect, the method may involve configuration of the one or more PLMN clusters as any of the primary PLMN cluster and the secondary PLMN cluster for multiple source node devices based on mapping of routing tables.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIGS. 4A-4B illustrate exemplary representations of a system architecture of service communication proxy (SCP), in accordance with an embodiment of the present disclosure.

FIG. 10 illustrates a flow chart representing steps of the proposed method, in accordance with an embodiment of the present disclosure.

FIG. 11 illustrates an exemplary computer system in which or with which embodiments of the present invention can be utilized, in accordance with embodiments of the present disclosure.

Figure 1A:
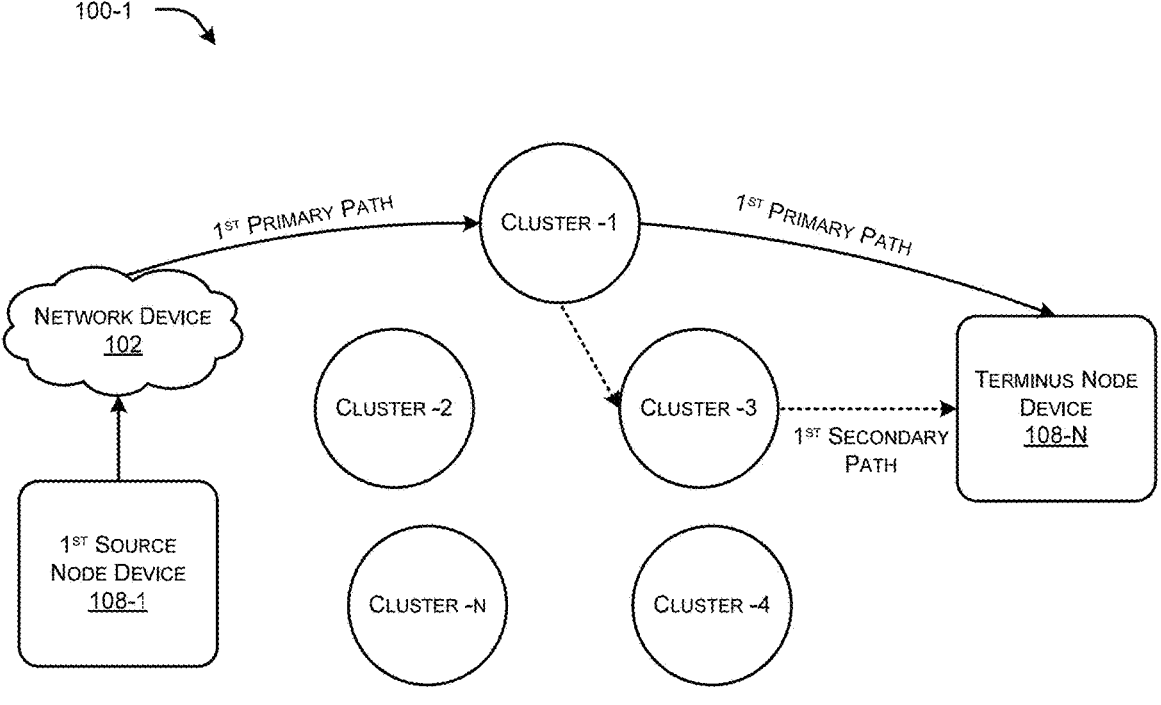
FIGS. 1A-1D illustrate exemplary network architecture in which or with which the proposed system can be implemented, to elaborate upon its working, in accordance with an embodiment of the present disclosure.

The foregoing shall be more apparent from the following more detailed description of the invention.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present disclosure provides a system and method that may overcome the above-mentioned limitations and may facilitate effective and improved management of traffic routing pertaining to incoming requests. In an example embodiment, the system may include Service Communication Proxy (SCP) implementation, which may facilitate evaluation, identification and/or configuration of pair of endpoints of active cluster and DR cluster prior to routing. For example, this may be performed based on pre-defined SCP policy such as hybrid routing policy or other associated integrated policies. In an example embodiment, prior to routing, the system and method may enable an identification/configuration of pair of endpoints in clusters pertaining to, for example, an active cluster and disaster recovery (DR) cluster. The active cluster may include active endpoints to which a request may be preferably routed if the endpoint may be available. The DR cluster may include DR endpoints, wherein the DR endpoints may be considered as an alternative endpoint for routing the request if the corresponding active endpoint in the active cluster may be unavailable or non-functional.

The identification/configuration of pair of endpoints may enable to determine the active endpoints and corresponding DR endpoints that may be available for routing, prior to the routing being performed, which may enable effective routing management of the incoming requests. In an examplary embodiment, as per hybrid technique/policy, each endpoint in the active cluster may be paired with a corresponding endpoint in the DR cluster to form a pair of endpoints. In an examplary embodiment, the SCP may include an SCP controller to enable the identification/configuration/mapping of endpoints in the disaster recovery (DR) cluster for the corresponding set of active cluster. In an examplary embodiment, the request may be routed to the identified/configured pair if at least one endpoint in the pair may be functional. For example, the SCP may evaluate when an endpoint of the active cluster, for example, a first endpoint is unavailable and may identify or configure a corresponding endpoint in the DR cluster, prior to routing the request. In another example, the SCP may evaluate when an endpoint, for example, a first endpoint of an active cluster is unavailable and also may be able to also evaluate if the corresponding DR endpoint (second endpoint) pertaining to the first endpoint is unavailable so that the request may not be routed at all to either the first or second endpoint in the pair.

In an examplary embodiment, hybrid routing policy may be used at an ingress node or egress node of SCP. In an embodiment, the hybrid routing policy endpoint details may be configured pairwise such that at a given time only one endpoint in the pair may receive request. In an example, total received requests may be routed in round robin manner between the pairs of endpoints.

Further, the system and method may be agnostic to architecture, structure, functionality of each node, and implementation of Network Functions. Furthermore, the system and method may facilitate SCP implementation that may enable load balancing, routing, traffic monitoring, congestion control, service discovery, and other such functions effectively. Various other associated embodiments or advantages may be possible.

FIGS. 1A-1D illustrate network architecture in which or with which the proposed system can be implemented, in accordance with an embodiment of the present disclosure.

In general, 5G network architecture can be designed in a way that multiple nodes can be closely interconnected, and so could be corresponding network functions. In an embodiment, some of the network functions of the 5G network architecture are as follows:

Access and Mobility Management function (AMF): The AMF can receive all connection and session related information from a communication device (also referred to as User Equipment or UE, herein), and is responsible for handling connection and mobility management tasks. For instance, the AMF can aid in termination of NAS (Non-Access Stratum) signaling, NAS ciphering and integrity protection, and management tasks, such as, but not limited to, registration management, connection management, mobility management, access authentication and authorization, security context management.

Session Management function (SMF): The SMF may carry out functions related to session management, for example, session establishment, modification, and release. Further, the SMF can handle User Equipment (UE) IP address allocation and management, DHCP functions, termination of NAS signaling related to session management, DL data notification, traffic steering configuration for user plane function (UPF) for proper traffic routing, and the like.

User plane function (UPF): The UPF may connect actual data coming over corresponding Radio Area Network (RAN) to the Internet. In an exemplary embodiment, the UPF may carry out packet routing and forwarding, packet inspection, and handle Quality of Service (QoS). Further, the UPF can act as external PDU session point of interconnect to Data Network (DN), and also can act as an anchor point for intra-RAT mobility as well as inter-RAT mobility.

Policy Control Function (PCF): The PCF can provide a unified policy framework, policy rules to CP functions, and access subscription information for policy decisions in UDR.

Authentication Server Function (AUSF): The AUSF can act as an authentication server, and function to check the authenticity of information flowing through it.

Unified Data Management (UDM): The UDM can generate Authentication and Key Agreement (AKA) credentials, perform user identification handling, access authorization, and carry out subscription management.

Application Function (AF): The AF can check application influence on traffic routing, access NEF, and can interact with a policy framework for policy control.

Network Exposure function (NEF): The NEF can carry out functions like exposure of capabilities and events, secure provision of information from an external application to 3GPP network, and translation of internal/external information.

NF Repository function (NRF): The NRF can perform service discovery function, maintains NF profile, and check available NF instances.

Network Slice Selection Function (NSSF): The NSSF may aid in selecting network slice instances to serve the UE, determining the allowed NSSAI, and determining the AMF set to be used to serve the UE.

It may be appreciated that the proposed system and architecture may not be limited only to 5G based systems/solutions but may also be used in independent or hybrid/integrated solutions implemented based on any or combination of 4G, 5G and/or 6G networks.

According to an embodiment, the system can also boost the network performance by continuously coordinating with other network functions. Further, the system architecture may leverage service-based interactions directly between NF Service consumers and NF Service producers, or indirectly via an SCP (Service Communication Proxy).

Referring to FIG. 1A, as illustrated, the proposed system 100-1 can be utilized for implementing hybrid routing technique in a network having some active clusters as well as some inactive clusters. The system 100-1 can include a network device 102 (also, referred to as controller 102, herein) that can be configured in communication with one or more public land mobile network (PLMN) clusters, such as cluster 1, cluster 2, cluster 3, cluster 4 . . . cluster N, associated with the network.

In an embodiment, the controller 102 can be in communication with a plurality of node devices 108-1, 108-2, 108-3 . . . 108-N, where the plurality of node devices can consist of multiple source node devices and a terminus node device, such that the controller 102 can receive a plurality of requests to be transmitted to said terminus node device, from the multiple source node devices (also, collectively referred to as source node devices, and individually referred to as source node device, herein). In one embodiment, a request can be manually transmitted by a user through a particular source node device. In other embodiment, the request can be automatically generated through a particular source node device.

Further, the controller 102 can determine, for each of the plurality of requests, a source node device along with correspondingly mapped primary PLMN cluster and secondary PLMN cluster among the one or more PLMN clusters. Thereafter, the controller 102 can determine status of each end point of the pre-mapped primary PLMN cluster.

In an embodiment, when the status of each end point of the pre-mapped primary PLMN cluster is determined to be inactive, the controller 102 can route the request through the pre-mapped secondary PLMN cluster for transmitting it to the terminus node device.

According to an embodiment, as illustrated in the FIG. 1A, in case a request is determined to be received from a first source node device 108-1, the controller 102 can be configured to select a first PLMN cluster, say cluster 1, from the one or more PLMN clusters for transmitting said request to the terminus node device 108-N. The controller 102 can further determine the status of all endpoints of the first PLMN cluster, i.e. cluster 1, wherein the cluster 1 may be a pre-mapped primary PLMN cluster for the source node device 108-1. In an embodiment, if the status of at least one of the endpoints of the first PLMN cluster is determined to be active, the system 100-1 can transmit said request directly through the first PLMN cluster to the terminus node device 108-N.

In another exemplary embodiment, in case the status of even at least one end point of the primary PLMN cluster is determined to be active, the controller 102 can be configured to directly route the request, through first primary path (as illustrated in the FIG. 1A), from the source node device 108-1 to the terminus node device 108-N via said end point of the primary PLMN cluster (cluster 1).

In other embodiment, when the status of more than one end points of the first PLMN cluster (cluster 1) is determined to be active, the controller 102 can distribute data traffic, pertaining to the requests among the plurality of requests associated with the first source node device 108-1, in the network proportionally among the active end points of the cluster 1.

In another embodiment, when the status of all the endpoints of the first PLMN cluster, i.e. cluster 1, is determined to be inactive, the controller 102 can be configured to select a second PLMN cluster, say cluster 3, from the one or more PLMN clusters, and route said request to the second PLMN cluster, i.e. cluster 3, for transmitting said request to the terminus node device 108-N. The second PLMN cluster can be a pre-mapped secondary PLMN cluster for the source node device 108-1. In an exemplary embodiment, the request can be routed from the cluster 1 to the cluster 3 using a Round Robin approach. In another exemplary embodiment, the controller 102 can be configured to route the request to the cluster 3, through first secondary path (as illustrated in the FIG. 1A).

In an implementation, the system 100-1 can facilitate configuration and mapping of the one or more PLMN clusters as any of the primary PLMN cluster and the secondary PLMN cluster based on mapping of routing tables. In an exemplary embodiment, the primary PLMN cluster may correspond to Active cluster whereas the secondary PLMN cluster may correspond to DR cluster.

In an embodiment, when the status of more than one end points of the second PLMN cluster (cluster 3) is determined to be active, the controller 102 can distribute data traffic, pertaining to the requests among the plurality of requests associated with the first source node device 108-1, in the network proportionally among the active end points of the cluster 3. In an embodiment, in case traffic is to be segregated between two clusters, such that one cluster will handle active traffic and the other cluster will handle DR traffic, the PLMN list of DR cluster may be replaced with an alias PLMN list. In such embodiment, this configuration may be defined at an SCP controller and/or an SCP proxy.

Further, in case the status of all the end points of the secondary PLMN cluster (cluster 3) is determined to be inactive, the system 100-1 can trigger, via the controller 102, a negative response corresponding to said request.

Figure 1B:
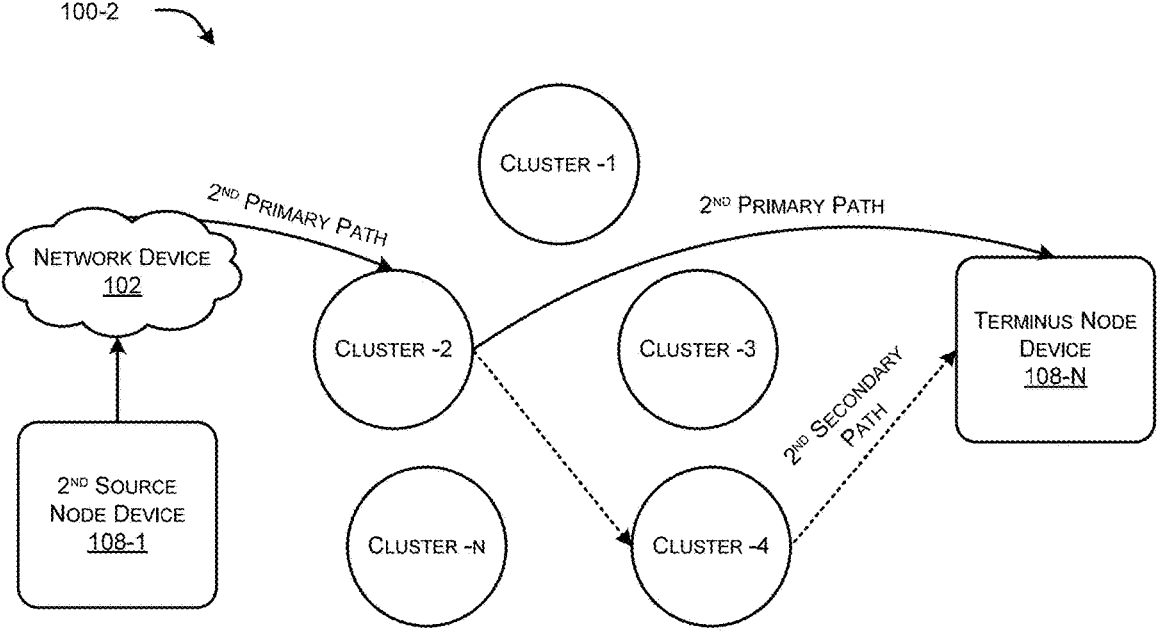

According to another embodiment, as illustrated in FIG. 1B, in case a request is determined to be received from a source node device other than the first source node device, say source node device 108-2, the controller 102 can be configured to select a third PLMN cluster, say cluster 2, from the one or more PLMN clusters for transmitting said request. Further, the controller 102 can determine the status of all endpoints of the third PLMN cluster (cluster 2), wherein the third PLMN cluster can be a pre-mapped primary PLMN cluster for said source node device 108-2.

In an embodiment, if the status of at least one of the endpoints of the third PLMN cluster (cluster 2) is determined to be active, the system 100-2 can transmit said request directly through the third PLMN cluster (cluster 2) to the terminus node device 108-N.

In an exemplary embodiment, in case the status of even at least one end point of the primary PLMN cluster (cluster 3) is determined to be active, the controller 102 can be configured to directly route the request, through second primary path (as illustrated in the FIG. 1B), from the source node device 108-1 to the terminus node device 108-N via said end point of the primary PLMN cluster (cluster 3).

In another embodiment, when the status of more than one end points of the third PLMN cluster (cluster 2) is determined to be active, the controller 102 can be configured to distribute data traffic, pertaining to the requests among the plurality of requests associated with said source node device 108-2, in the network proportionally among the active end points of the third PLMN cluster (cluster 2).

In one embodiment, when the status of all the endpoints of the third PLMN cluster (cluster 2) is determined to be inactive, the controller 102 can be configured to select a fourth PLMN cluster, say cluster 4, from the one or more PLMN clusters, and route said request from the third PLMN cluster (cluster 2) to the fourth PLMN cluster (cluster 4), for instance via Round Robin approach, for transmitting said request to the terminus node device, wherein the fourth PLMN cluster (cluster 4) can be a pre-mapped secondary PLMN cluster for said source node device.

In an exemplary embodiment, said request can be routed from the third PLMN cluster (cluster 2) to the fourth PLMN cluster (cluster 4) via second secondary path (as illustrated in the FIG. 1B).

In other embodiment, in case the status of all the end points of the secondary PLMN cluster is determined to be inactive, the controller 102 may be configured to trigger a negative response corresponding to said request.

In an exemplary embodiment, a single PLMN cluster can be divided into two sub-clusters, wherein one of the two sub-clusters can act as the third PLMN cluster and the other can act as the fourth PLMN cluster. In another exemplary embodiment, the controller 102 can facilitate configuration and pre-mapping of the one or more PLMN clusters as any of the primary PLMN cluster and the secondary PLMN cluster for multiple source node devices based on mapping of routing tables.

In one exemplary embodiment, the system 100-2 can be configured to map one primary PLMN cluster with more than one secondary PLMN clusters. In other exemplary embodiment, the system 100 can be configured to map more than one primary PLMN clusters with one secondary PLMN cluster.

In an exemplary embodiment, the system can also include tertiary PLMN cluster, wherein in case all the end points of the secondary routers are also in the inactive condition, the system 100-2 can route the request through the tertiary PLMN cluster.

In an embodiment, a number of the end points of a primary PLMN cluster can be equal to number of end points of corresponding secondary PLMN cluster. In other embodiment, the number of the end points of the primary PLMN cluster may differ from the number of end points of corresponding secondary PLMN cluster.

Figure 1C:
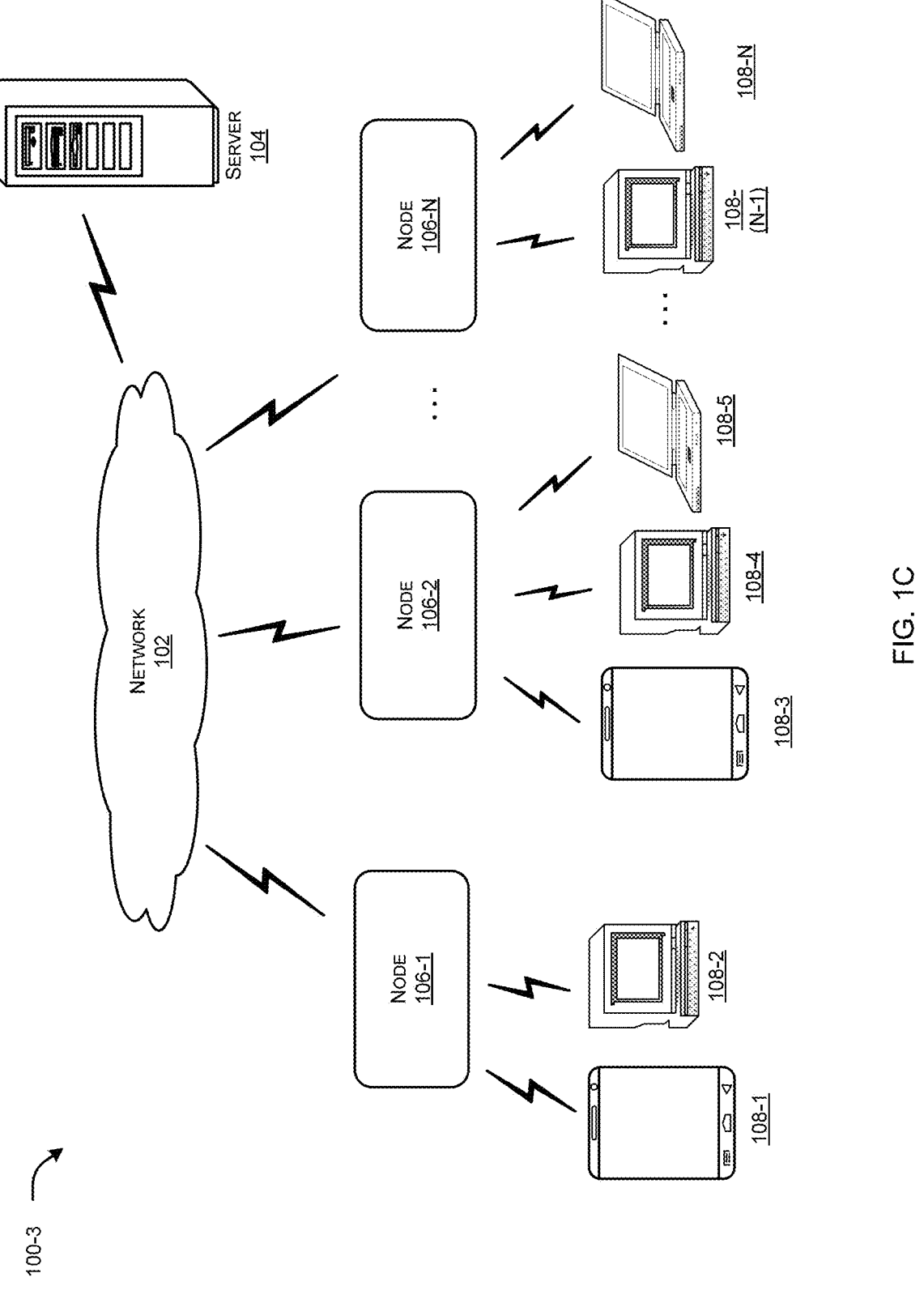

As illustrated in FIG. 1C, the network device 102 which may be coupled with a plurality of nodes including Node 106-1, Node 106-2 . . . Node 106-N, and configured to facilitate a secured communication among the plurality of nodes (collectively referred to as nodes 106, and individually referred to as node 106, hereinafter).

In an embodiment, each of the nodes can be configured to be coupled with a multitude of user devices 108-1, 108-2, 108-3, 108-4 . . . 108-(N–1), 108-N (collectively referred to as user devices or UE 108, and individually referred to as user device 108, hereinafter). In one embodiment, the system 100-3 can establish a secured communication between user devices associated with distinct nodes. In another embodiment, the system 100-3 can establish a secured communication between user devices associated with the same node.

In an exemplary embodiment, the system 100-3 can effectively establish a secured communication between user device 108-1 and user device 108-2, where the user device 108-1 and the user device 108-2 both are coupled with Node 106-1. In another exemplary embodiment, the system 100 can establish a secured communication between user device 108-2 and user device 108-N with equal effectiveness, where the user device 108-2 is coupled with Node 106-1 and the user device 108-N is coupled with Node 106-N.

In an exemplary embodiment, the network device 102 (also, referred to as network 102, herein) may be configured as an application server and may be communicably operational or may be integrated with a user device 108 via a network coupled with a server 104. In another exemplary embodiment, the user device 108 may a wireless device. The wireless device may be a mobile device that may include, for example, cellular telephone, such as a feature phone or smartphone and other devices. The user device 108 may not be limited to the above-mentioned devices, but may include any type of device capable of providing wireless communication, such as a cellular phone, a tablet computer, a personal digital assistant (PDA), a personal computer (PC), a laptop computer, a media centre, a work station and other such devices. The SCP implementation may pertain to ingress node and/or egress node. In case of ingress node implementation, the NF Profile used for registration may include multiple of 2 endpoints and in correct sequence. In an example embodiment, 0 based indexing may be used such that endpoint an even index should belong to active cluster while odd index should belong to DR cluster.

In an embodiment, the proposed system 100-3 may not only resolve the challenges introduced by the next generation service-based architecture but may also be able to optimize signaling controls. The system 100-3 may enable a service provider to get a better visibility towards a core network, where the core network may be defined as backbone of the network architecture. For example, in the present disclosure, the core network may pertain to 5G service-based architecture may be configured to interconnect distinct networks associated with the architecture. Therefore, the core network may provide a path for the exchange of information between one or more of the networks, and corresponding subnetworks. Further, as the backbone, the core network may tie together diverse networks, say Local Area Network (LAN), Wide Area Network (WAN), Metropolitan Area Network (MAN), etc. which may be there within the same building, in different buildings, in a campus environment, or remotely located over wide areas. The system may also boost the network performance by continuously coordinating with other network functions. According to an embodiment, the 5G system architecture may leverage service-based interactions directly between NF Service consumers and NF Service producers, or indirectly via an SCP (Service Communication Proxy).

In an example embodiment, the network may pertain to at least one of a wireless network, a wired network or a combination thereof. The network may be implemented as one of the different types of networks, such as Intranet, LAN, WAN, Internet, and the like. Further, the network may either be a dedicated network or a shared network. The shared network may represent an association of the different types of networks that may use a variety of protocols, for example, Hypertext Transfer Protocol (HTTP), Transmission Control Protocol/Internet Protocol (TCP/IP), Wireless Application Protocol (WAP), Automatic repeat request (ARQ), and the like. In an embodiment, the network may pertain to, for example, a 5G network that may be facilitated through, for example, Global System for Mobile communication (GSM) network; a universal terrestrial radio network (UTRAN), an Enhanced Data rates for GSM Evolution (EDGE) radio access network (GERAN), an evolved universal terrestrial radio access network (E-UTRAN), a WIFI or other LAN access network, or a satellite or terrestrial wide-area access network such as a wireless microwave access (WIMAX) network. Various other types of communication network or service may be possible.

In an example, the network 102 may utilize different sorts of air interface, such as a code division multiple access (CDMA), time division multiple access (TDMA), or frequency division multiple access (FDMA) air interface and other implementation. In an example embodiment, the wireline user device may use wired access networks, exclusively or in combination with wireless access networks, for example, including Plain Old Telephone Service (POTS), Public Switched Telephone Network (PSTN), Asynchronous Transfer Mode (ATM), and other network technologies configured to transport Internet Protocol (IP) packets.

Figure 1D:
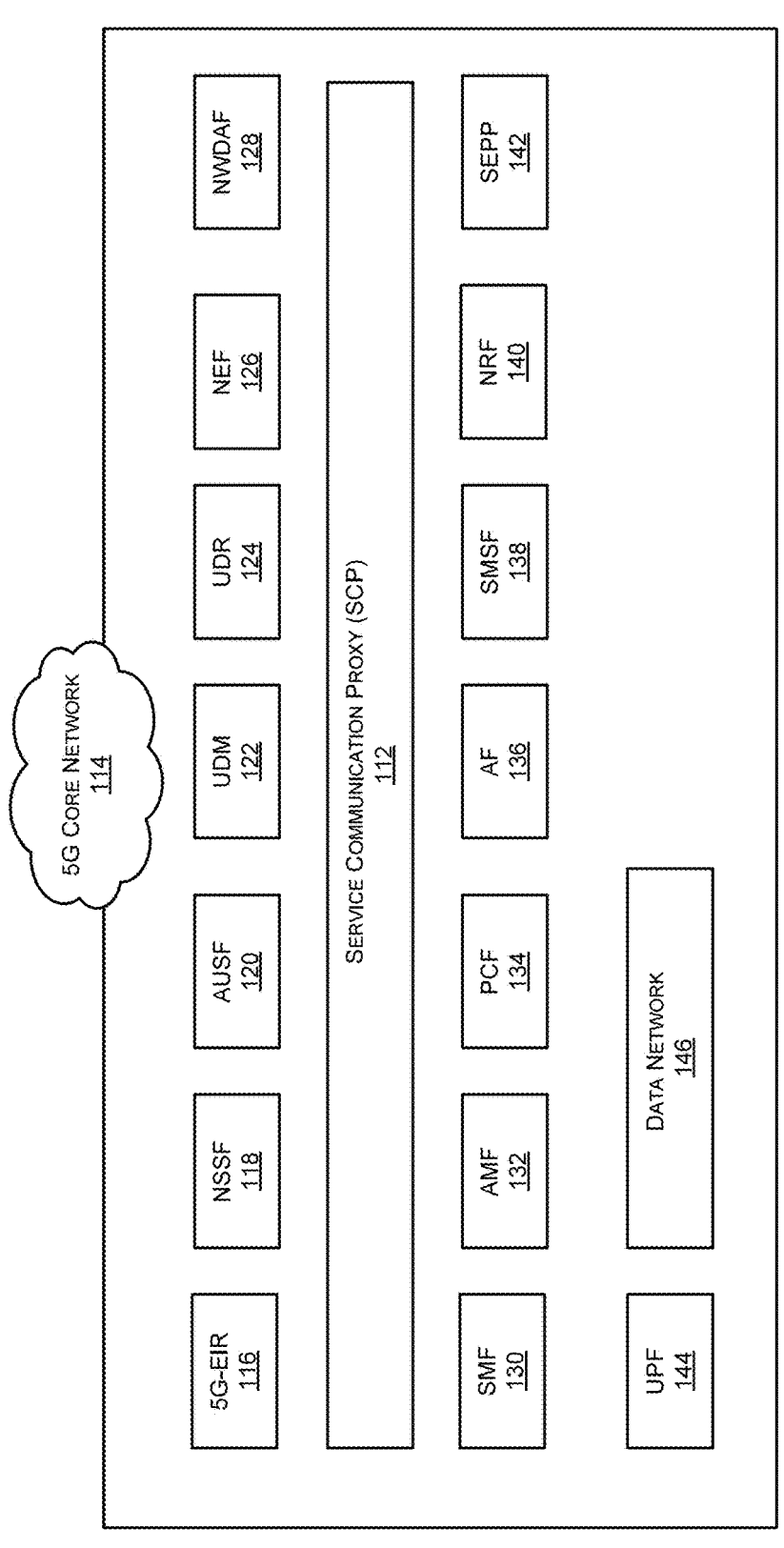

In an embodiment, as illustrated in FIG. 1D, the proposed system 100-4 can facilitate interaction of SCP 112 along with various distinct network components and corresponding network functions, where the SCP 112 can be communicatively coupled to all other equipment through the core network 114. In one embodiment, the core network 114 can facilitate communicative coupling of the SCP 112 with 5G-EIR 116, where the 5G-EIR can be defined as an independent network component that may help telecom operators in protecting their networks. The 5G-EIR can aid in protecting a network by providing a mechanism to restrict malicious user terminals in the network.

In other embodiment, the core network 114 can facilitate communicative coupling of the SCP 112 with a network component supporting Network Slice Selection Function 118 (NSSF 118), where the NSSF 118 can select network slice instances to serve user device 108, determine the allowed NSSAI, determine AMF set to be used to serve the user device 108.

In another embodiment, the SCP 112 can be coupled with a network component supporting Authentication Server Function 120 (AUSF) 120, where the AUSF can act as an authentication server, and function to check authenticity of information flowing through it.

In yet another embodiment, the SCP 112 can be coupled with network components supporting Unified Data Management 122 (UDM 122) and Unified Data Repository 124 (UDR 124), where the UDM 122 can facilitate a centralized technique to control network user data. For instance, the UDM 122 can generate Authentication and Key Agreement (AKA) credentials, perform user identification handling, access authorization, and carry out subscription management.

Further, the UDR 124 can act as a converged repository for information related to subscribers and can facilitate service to a number of network functions. For example, the 5G UDM (Unified Data Management) can use the UDR to store and retrieve data pertaining to subscription. Alternatively, the PCF (Policy Control Function) can use the UDR to store and retrieve policy related data. Further, the NEF (Network Exposure Function) may also use the UDR to store subscriber related data that is permitted to be exposed to 3rd party applications.

In one embodiment, the SCP 112 can be coupled with a network component supporting Network Exposure function 126 (NEF 126), where the NEF can carry out functions like exposure of capabilities and events, secure provision of information from external application to 3GPP network, and translation of internal/external information.

In yet another embodiment, the SCP 112 can be coupled with a network component supporting a 5G network data analytics function 128 (NWDAF 128), which can be configured to streamline and control the way core network data is produced and consumed, and provide insights and suggest actions to be taken in order to enhance end-user experience. In an exemplary embodiment, the NWDAF can be configured to overcome market fragmentation and proprietary solutions in the area of network analytics. Further, the NWDAF may address three primary standardization points—

Data collection interface from network nodes

Predefined analytics insights

Data exposure interface for consumers

In an embodiment, the SCP 112 can be coupled with network components supporting Session Management function 130 (SMF 130), Access and Mobility Management function 132 (AMF 132), Policy Control Function 134 (PCF 134), and Application Function 136 (AF 136), where the SMF 130 can carry out functions related to session management, for example, session establishment, modification, and release. Further, the SMF 130 can handle User Equipment (UE) IP address allocation and management, DHCP functions, termination of NAS signaling related to session management, DL data notification, traffic steering configuration for user plane function (UPF) for proper traffic routing, and the like.

Further, the AMF 132 can receive all connection and session related information from a communication device (also referred to as User Equipment, herein), and can be responsible for handling connection and mobility management tasks. Furthermore, the PCF 134 can provide a unified policy framework, policy rules for CP functions, and access to subscription information for policy decisions in UDR. The AF 136 can check application influence on traffic routing, access NEF, and can interact with policy framework for policy control.

In an embodiment, the SCP 112 can be coupled with network components supporting Short Message Service Function 138 (SMSF 138), NF Repository function 140 (NRF 140), Security Edge Protection Proxy 142 (SEPP 142), and User plane function 144 (UPF 144). The SMSF 138 can facilitate the transfer of SMS over NAS, in 5G architecture. Moreover, the SMSF 138 can conduct subscription checking as well as it can perform a relay function between the user device 108 and SMSC (Short Message Service Centre), through interaction with the AMF (Core Access and Mobility Management Function).

Further, the NRF 140 can be configured to perform service discovery function, maintain NF profile and can also check available NF instances. Also, the BroadForward Security Edge Protection Proxy 142 (BroadForward SEPP 142) can facilitate a secured communication between one or more 5G networks. The SEPP 140 can also provide end-to-end confidentiality and/or integrity between source and destination network for all 5G interconnect roaming messages.

Furthermore, the UPF 144 can function to connect actual data coming over corresponding Radio Area Network (RAN) to the Internet. In an exemplary embodiment, the UPF 144 can carry out packet routing and forwarding, packet inspection, and handle Quality of Service (QoS). Further, the UPF 144 can act as external PDU session point of interconnect to a Data Network (DN) 146, and also can act as an anchor point for intra-RAT mobility as well as inter-RAT mobility.

It should be noted that functioning of the SCP 112 is independent of distance between the Network Functions. Moreover, the SCP 112 can facilitate peer-to-peer communication between peer instances/nodes.

Further, basic functionality of the SCP 112 is to provide end-to-end connectivity between different nodes having distinct deployment scenarios, architecture, and functionality while managing such architectures efficiently. Routing capability of the proposed system 100-4 is agnostic to each node's architecture, structure, functionality, and implementation of Network Functions.

In an embodiment, the present system and method may be applied as an integrated or a hybrid routing solution based technique including, but not limited to, any or combination of fourth generation (4G), fifth generation (5G) or sixth generation (6G) based architecture/implementation. In an example embodiment, the routing solution and algorithm may include 4G-5G based interworking routing scenario including interworking. For example, this implementation may be obtained by converting protocols including, but not limited to:

HTTP2 to HTTP

Other Conversions may also be possible at the TCP/IP layer. For example, communication between NEF (5G Node)-SCEF (4G Node), and HSS (4G) as well as UDM (5G). Various other protocols may be used within the scope of the present disclosure.

In another example embodiment, the routing solution may be designed in a way to solve upcoming 6G routing. For example, it may be possible to achieve this by enabling grid routing or it may be possible to plug in any protocol stack or by implementation of other aspects. In yet another example embodiment, the routing solution may include artificial intelligence (AI) based adaptive routing based on historic data availability. In yet another example embodiment, the routing solution may include an adaptive circuit breaker mechanism that may enable to detect catastrophic events in the network and may protect the network element. Various other similar aspects/embodiments may be possible.

Figure 2:
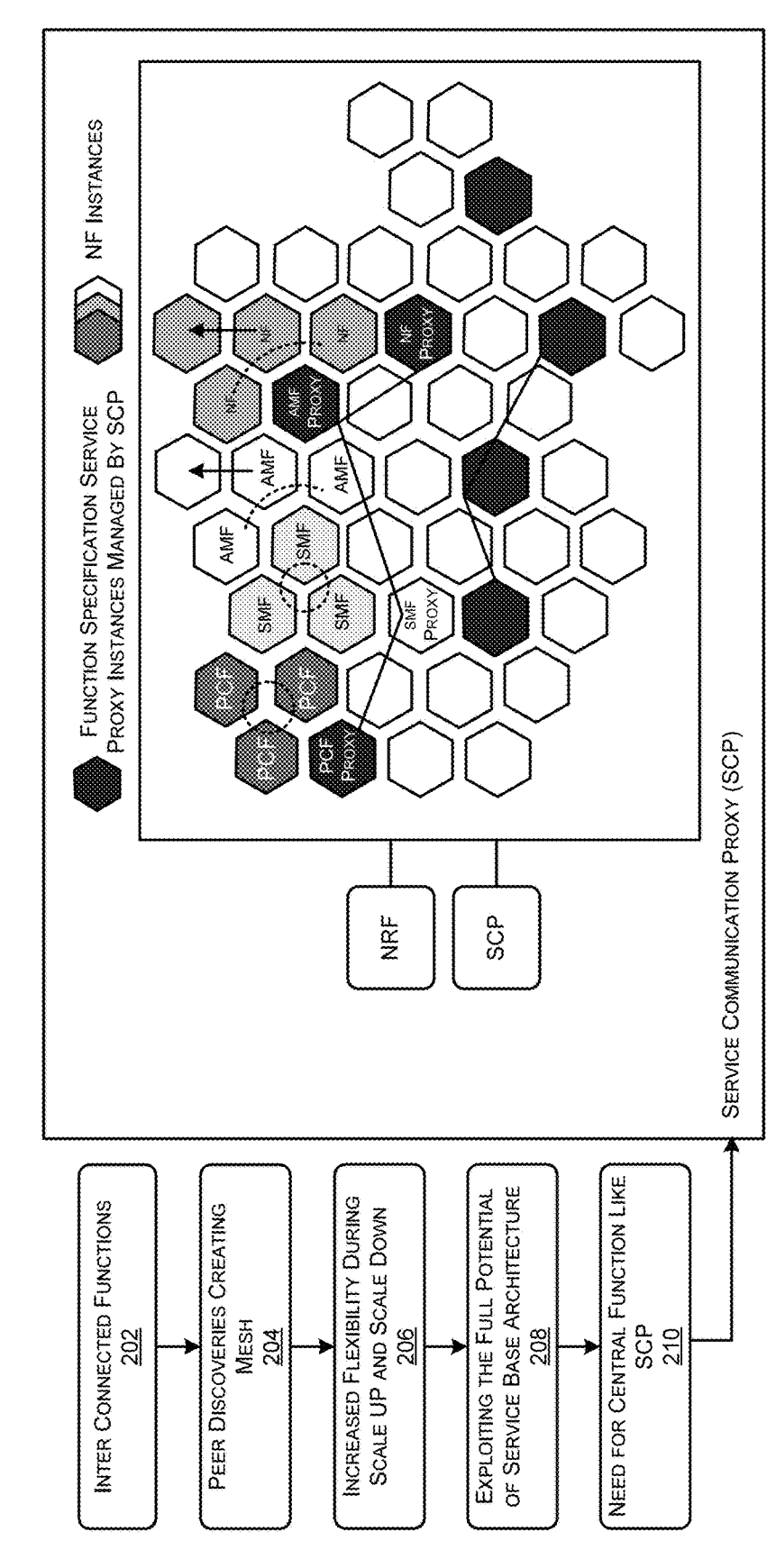
FIG. 2 with reference to FIG. 1D illustrates an exemplary diagram of SCP implementation, in accordance with an embodiment of the present disclosure.

FIG. 2 with reference to FIG. 1D, illustrates in 200, an exemplary diagram of SCP implementation, in accordance with an embodiment of the present disclosure. FIG. 2 mainly depicts present implementation for intelligent load balancing, routing, monitoring and congestion control at application layer, i.e., Layer 7 of an open systems intercommunication (OSI) model, which may fully decouple service layer from the infrastructure layer. The SCP may not only resolve the challenges related to the next generation based architecture, such as, for example 5G Service Based Architecture but may also optimize signaling controls, and thus may provide better visibility into the core network. The SCP 112 may also boost the network performance by continuously coordinating with other network functions.

In one embodiment, the system 100 may carry out, at block 202, interconnected functions, and facilitate communication, at block 204, in between peer nodes and create a mesh based on discoveries/information delivered by the peer nodes. In an embodiment, the proposed system includes network functions that are closely interconnected. The system has the ability to discover the peer nodes and transfer network information. Further, the system 100 may facilitate, at block 206, scale up and scale down functions, which may be provided with increased flexibility. Furthermore, the system 100 may enable, at block 208, exploitation of maximum potential of service-based architecture. Moreover, at block 210, the system 100 may address the need for a module with some central function, and thereby may facilitate a secured communication of the nodes 106 with the SCP 112 (of FIG. 1D). In an embodiment, the system optimizes the data path of the information exchanged between the network functions and resolves issues including, but not limited to, congestion control, traffic prioritization, overload control, and the like. For example, SCP 112 may be configured to control the flow of data/information between the nodes by facilitating load balancing, routing, traffic monitoring, congestion control, and service discovery in the Layer 7 service Mesh. In an exemplary embodiment, the system 100 may determine Network Function (NF) instances, and correspondingly the SCP 112 may manage function specification service proxy instances. In another exemplary embodiment, the NRF 140 may also provide facilities for registration, re-registration and NF discovery.

In another exemplary embodiment, the system 100 may include NF which may communicate with NRF 140 through SCP controller. For instance, a PCF proxy running with 'x' NF services and 'y' instances may communicate, through the SCP controller of the SCP 112, with the NRF 140, which may act as central repository and may include information about all the NFs. In another exemplary embodiment, the SCP controller may be trained to configure SCP proxies based on real-time situation. Therefore, no pre-configuration of the SCP proxies may be required in the system 100.

Figure 3A:
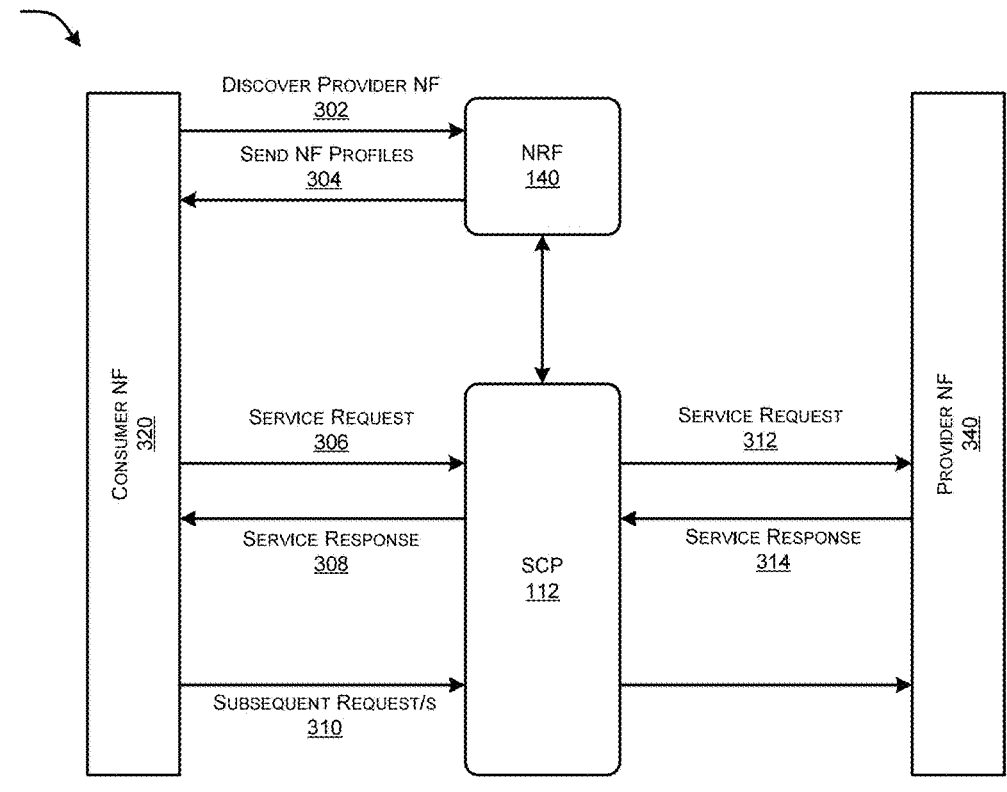
FIG. 3A illustrates an exemplary representation of a flow diagram illustrating indirect communication, through the proposed system, with delegated discovery, in accordance with embodiments of the present disclosure.
Figure 3B:
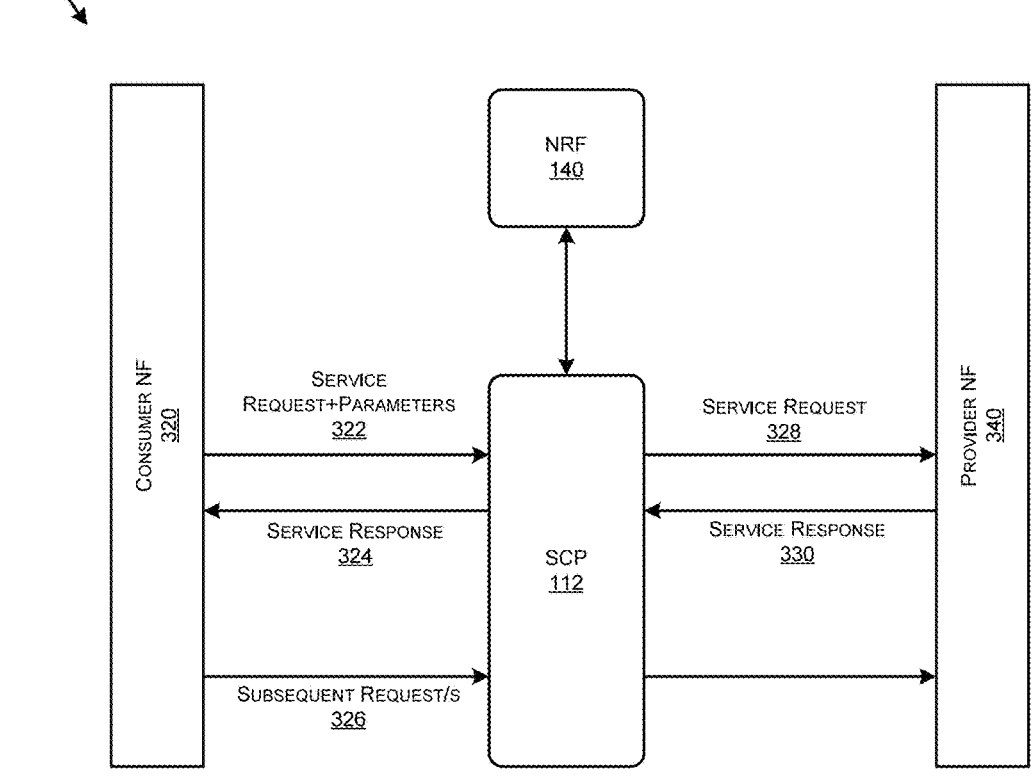
FIG. 3B illustrates an exemplary representation of a flow diagram illustrating indirect communication, through the proposed system, without delegated discovery, in accordance with embodiments of the present disclosure.

FIG. 3A illustrates an exemplary representation of flow diagram illustrating indirect communication, through the proposed system, with delegated discovery, in accordance with embodiments of the present disclosure. FIG. 3B illustrates an exemplary representation of a flow diagram illustrating indirect communication, through the proposed system, without delegated discovery, in accordance with embodiments of the present disclosure. Referring to FIGS. 3A and 3B, the system 100 implements SCP 112 (of FIG. 1D) to support both the scenarios of indirect communication, i.e. indirect communication with/without delegated discovery, for the discovery of the peer network functions.

Indirect communication without delegated discovery: As shown in 300-1 in FIG. 3A, in this case, a consumer node or consumer NF 320 (consumer NF pertaining to UE sending the request) may query, at 302, the NRF 140 directly to obtain information pertaining to NF profiles of provider node or provider NF 340 (destination node where the request needs to be sent). Based on discovery result, at 304, the NRF 140 may send NF profiles to the consumer node 320. In an example embodiment, based on the discovery result, the consumer NF 320 may select an NF instance of NF Service instance set. At 306 consumer NF 320 may send the request to the SCP 112 including the address of the selected service producer pointing to an NF service instance or a set of NF service instances. In an example embodiment, the SCP 112 may possibly interact with NRF 140 to get selection parameters such as location, capacity, and other such information. At 312, the SCP 112 may route the request to the selected NF service provider instance or provider node 340. At 314, the provider NF 340 may, generate a service response, which may further be transmitted, at 316, to the consumer NF 320 through the SCP 112. Similarly, subsequent request(s) may be transmitted, at 310, which may be further processed in the same manner.

Indirect communication with delegated discovery: This mode of communication may function even when users do not perform any discovery or selection. As shown in 300-2 in FIG. 3B, in this case, a consumer node or consumer NF 320 (consumer NF pertaining to UE sending the request) may not query the NRF 140 directly to obtain information pertaining to NF profiles of provider node or provider NF 340 (destination node where the request needs to be sent) shown in FIG. 3A. In an example embodiment and as shown in FIG. 3B, at 322, consumer node 320 may add any necessary discovery and selection parameters required to find a suitable provider node 340 to the service request. In an example embodiment, the SCP may perform discovery with an NRF 140 and obtain the discovery result. The SCP 112 may use the request address and the discovery selection parameters in the request message to route the request to a suitable producer instance/provider node 340 as shown in the step 328. The provider NF 340 may, in turn, generate, at 330, a service response, which may further be transmitted, at 324, to the consumer NF 320 through the SCP 112. Similarly, subsequent request (s) may be transmitted, at 326, which may be further processed in the same manner.

In an exemplary embodiment, the proposed SCP 112 may also be used for indirect communication between NFs and NF services within any or a combination of Public Land Mobile Network (PLMN) such as, for example, Visiting Public Land Mobile Network (VPLMN) and Home Public Land Mobile Network (also referred to as HPLMN).

According to an embodiment, apart from acting as a proxy or a routing agent between various Network Functions, the SCP 112 may also be configured to carry out following functionalities:

Communication Security: The SCP platform may be configured to allow only authorised consumer NFs to communicate with the provider NF.

Load balancing: The provider NFs may configure various load balancing techniques such as Round Robin and Weighted Scheduling, wherein in the Round Robin load balancing technique, client requests may be routed to available servers on a cyclical basis. Round robin server load balancing may work at its best when servers have roughly identical computing capabilities and storage capacity.

Security Supporting: The SCP also supports security mechanisms between the consumers and providers of the network services.

Traffic Monitoring: The SCP may monitor the performance of the Provider NFs in terms of number of service requests being processed.

Traffic Prioritization: The SCP platform may be configured to give priorities to specific Consumer NFs requests against any other Consumer NFs.

Discovery of NFs: SCP provides interfaces to identify most appropriate instances of other network functions (e.g. AUSF, PCF) for a specific UE's SUPI, SUCI or GPSI.

Overload control: The SCP has the capability to put a cap on number of authorisation on a specific instance of Provider NFs. This means, in a case where the number of Consumer Application reaches to a threshold limit, it will not authorise new consumer NFs.

Figure 4A:
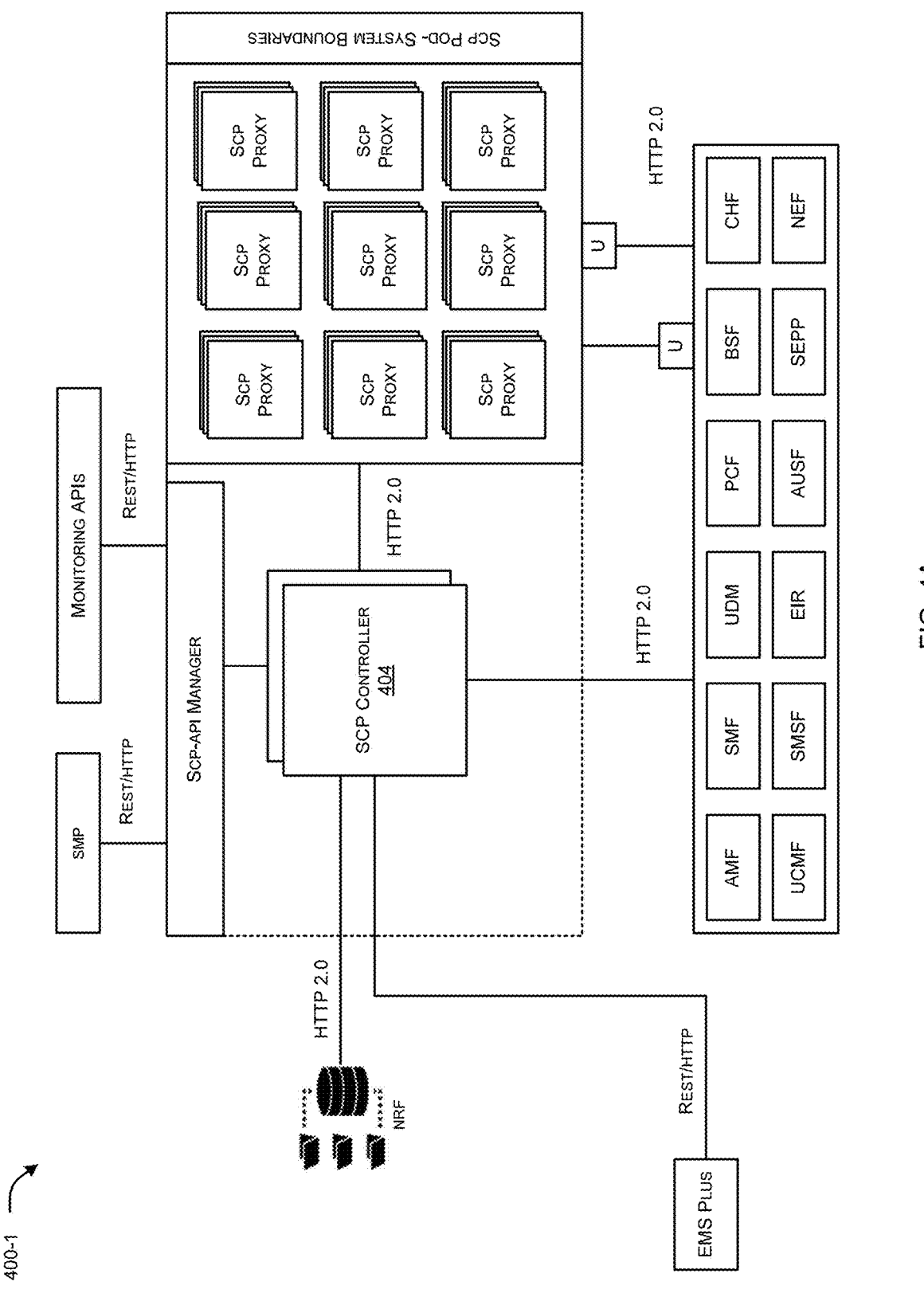

FIGS. 4A-4B illustrates exemplary representation 400-1 and 400-2 of a system architecture of service communication proxy (SCP), in accordance with an embodiment of the present disclosure. Referring to FIG. 4A, point-of-delivery (POD) may be outlined by the dashed lines and alongside are the system boundaries of the Service Communication Proxy (SCP) 112. All the other systems/components may be 3GPP defined 5G Network Functions which may include protocol interfaces with the SCP 112.

In an embodiment, the architecture of Service Communication Proxy (SCP) may include at least one of the following functionalities—

Indirect Communication

Delegated Discovery

Message forwarding and routing to destination NF/NF service

Communication security (e.g. authorization of the NF Service Consumer to access the NF Service Producer API), load balancing, monitoring, overload control, etc.

Optionally interact with UDR, to resolve the UDM Group ID/UDR Group ID/AUSF Group ID/PCF Group ID/CHF Group ID/HSS Group ID based on UE identity, e.g. SUPI or IMPI/IMPU.

In an embodiment, the proposed SCP 112 may include a SCP Proxy along with a SCP controller 404. In one embodiment, the SCP Proxy may be either ingress proxy or egress proxy, wherein:

Ingress Proxy: This proxy instance ensures incoming traffic for producer NF based on configured policy default is round robin.

Egress Proxy: This proxy instance ensures consumer's outgoing traffic flow to a right SCP Ingress proxy, and routing based on NF or SCP selection criteria.

It may be appreciated that a hybrid deployment is also possible where a single SCP Instance may act as egress as well as ingress proxy.

In an embodiment, the SCP 112 may include multiple SCP proxies as shown in FIG. 4A, which may be communicatively linked to the SCP controller 404 along with NRF, EMS Plus, SMP, APIs, and various network functions via an HTTP module. Further, the SCP controller 404 may be configured to manage all SCP proxy instances and select appropriate proxy instance as egress or ingress for target NFs during NF Registration and Discovery flow, and in order to do so, the SCP Controller 404 need to deploy in front of NRF Clusters serving for multiple PLMN or Single PLMN. In an exemplary embodiment, the SCP controller 404 may configure some instances of PLMN to act as a disaster recovery (DR) endpoint for corresponding set of Active PLMN cluster endpoint.

In an embodiment, and as shown in FIG. 4B, an example architecture of the SCP 112 is shown. The SCP 112 may facilitate routing of the requests by a combination of hardware and software implementation. FIG. 4B illustrates an exemplary representation of SCP 112 of FIG. 1D, in accordance with an embodiment of the present disclosure. The SCP 112 may include one or more processors or controllers (for example, SCP controller 404 as shown in FIG. 4A). The one or more processor(s) or controller(s) 404 may be coupled with a memory 410. The memory 410 may store instructions those when executed by the one or more processors or controller(s) 404 may cause the SCP 112 to perform the steps as described herein.

In an embodiment, the processor(s) or controller(s) 404 may enable routing of requests from a consumer node (pertaining to a user device sending the request) to a destination mode (or provider node). For example, the processor(s) or controller(s) 404 of the SCP 112 may identify/configure at least one endpoint or node, prior to routing the request. In this example, the identification of available endpoints in a cluster of endpoints may be done, wherein the cluster may pertain to, for example, a primary/active cluster and a secondary/DR cluster. In an example embodiment, the request may be routed to the identified/configured pair if at least one endpoint in the pair may be functional. The active cluster may include active endpoints to which request may be preferably routed if the endpoint may be available. The DR cluster may include DR endpoints, wherein the DR endpoints may be considered an alternative endpoint for routing the request if the all the endpoints of the primary cluster may be unavailable or non-functional.

In an instance, as per the hybrid policy, status/operating condition of all the endpoints in the active and DR clusters may be identified. The configuration/identification may be performed prior to the routing, which may enable effective management of the incoming requests. This may also enable to pre-plan the routing directly to DR endpoint (in the DR cluster) if none of the endpoint (in active cluster) may be available. In an alternate embodiment, multiple endpoints in active cluster may be paired to a single DR endpoint.

In an example embodiment, the identification/configuration of pair of endpoints may be performed based on pre-defined policy of the SCP 112. For example, the pre-defined policy may pertain to hybrid specific primary secondary implementation, which is explained herein. For example, the processor(s) or controller(s) 404 may evaluate when all the endpoints of the active cluster are unavailable and may be able to configure some endpoints in corresponding DR cluster, prior to routing the request. In another example, the processor(s) or controller(s) 404 may evaluate when none of the endpoints of the active cluster are available and also may be able to evaluate if all the endpoints of corresponding DR are also unavailable so that the request may not be routed at all. This may save unnecessary re-routing and may also facilitate effective routing steps. In an example embodiment, the identification/configuration of endpoints may be performed based on a pre-defined criteria. For example, the pre-defined criteria may pertain to, for example, header routing criteria, which may enable the processor(s) or controller(s) 404 of the SCP 112 to decide which endpoints to be selected (prior to routing) based on the availability. Various other examples are provided in the following sections, although the present disclosure may not be limited by these examples. In an example, the header routing criteria may be pre-defined in 3GPP TS 29.500. For example, the header routing criteria may include, but not limited to, at least one of:

a) 3gpp-sbi-discovery
    b) 3gpp-sbi-target-apiroot
    c) 3gpp-sbi-binding/3gpp-sbi-routing-binding In an example embodiment, if multiple pre-defined criteria or header routing criteria may be considered, the processor(s) or controller(s) 404 may be able to prioritize the pre-defined criteria to enable appropriate selection/identification/configuration of endpoints prior to routing of the request. Various other embodiments may be possible.

The SCP implementation may pertain to ingress node and/or egress node. In case of ingress node implementation, the NF Profile used for registration may include multiple of 2 endpoints and in correct sequence. In an example embodiment, 0 based indexing may be used such that endpoint at even index should belong to active cluster while odd index should belong to DR cluster.

The processor(s) or controller(s) 404 may be implemented as one or more microprocessors, microcomputers, microcontrollers, digital signal processors, central processing units, logic circuitries, and/or any devices that process data based on operational instructions. Among other capabilities, the processor(s) or controller(s) 404 may be configured to fetch and execute computer-readable instructions stored in a memory 410 of the SCP 112. The memory 410 may be configured to store one or more computer-readable instructions or routines in a non-transitory computer readable storage medium, which may be fetched and executed to create or share data packets over a network service. The memory 410 may comprise any non-transitory storage device including, for example, volatile memory such as RAM, or non-volatile memory such as EPROM, flash memory, and the like.

In an embodiment, the SCP 112 may include an interface(s) 412. The interface(s) 412 may comprise a variety of interfaces, for example, interfaces for data input and output devices, referred to as I/O devices, storage devices, and the like. The interface(s) 412 may facilitate communication of the SCP 112. The interface(s) 412 may also provide a communication pathway for one or more components of the SCP 112. Examples of such components include, but are not limited to, processing engine(s) or modules 404-1 and a database 424.

The processing engine(s) or modules 404-1 may be implemented as a combination of hardware and programming (for example, programmable instructions) to implement one or more functionalities of the processing engine(s) or modules 404-1. In examples described herein, such combinations of hardware and programming may be implemented in several different ways. For example, the programming for the processing engine(s) or modules 404-1 may be processor executable instructions stored on a non-transitory machine-readable storage medium and the hardware for the processing engine(s) or modules 404-1 may comprise a processing resource (for example, one or more processors), to execute such instructions. In the present examples, the machine-readable storage medium may store instructions that, when executed by the processing resource, implement the processing engine(s) or modules 404-1. In such examples, the SCP 112 may comprise the machine-readable storage medium storing the instructions and the processing resource to execute the instructions, or the machine-readable storage medium may be separate but accessible to the SCP 112 and the processing resource. In other examples, the processing engine(s) or modules 404-1 may be implemented by electronic circuitry.

In an embodiment, the processor(s) or controller(s) 404 may pertain to an ingress controller to enable processing/controlling one or more aspects of received incoming request at an ingress node (entry point) of SCP 112. In another embodiment, the processor(s) or controller(s) 404 may pertain to an egress controller to enable processing/controlling one or more aspects of request that are being routed at an egress node (exit point) of SCP 112. In yet another embodiment, the processor(s) or controller(s) 404 may pertain to an integrated controller including both ingress and egress controller to enable processing/controlling one or more aspects of received incoming request at an ingress node (entry point) of SCP 112 and/or to enable processing/controlling one or more aspects of request that are being routed at an egress node (exit point) of SCP 112.

The processing engine or modules 404-1 of the SCP 112 may include one or more components, as illustrated in FIG. 4B, including receiving module 416, proxy information module 418, routing module 420 and other modules or components 422. In an embodiment, the receiving module 416 may enable to receive an incoming request from a consumer node through an ingress controller, and the routing module 420 may enable to route the request through the egress controller to the provider node. The proxy information module 418 may enable collecting or storing an information pertaining to available proxy or endpoints pertaining to active and/or DR cluster. The other modules or components 422 may include, but not limited to, ingress module (pertaining to ingress node), egress module (pertaining to egress node), load balancer, edge router configuration module, mapping module (to map endpoints pertaining to active and/or DR cluster), request processing module, error message generation module and other modules or engines. Various other functions of the components may be possible. In an embodiment, database 210 may comprise data that may be either stored or generated as a result of functionalities implemented by any of the components of the processing engine(s) modules 404-1 of SCP 112.

Figure 5:
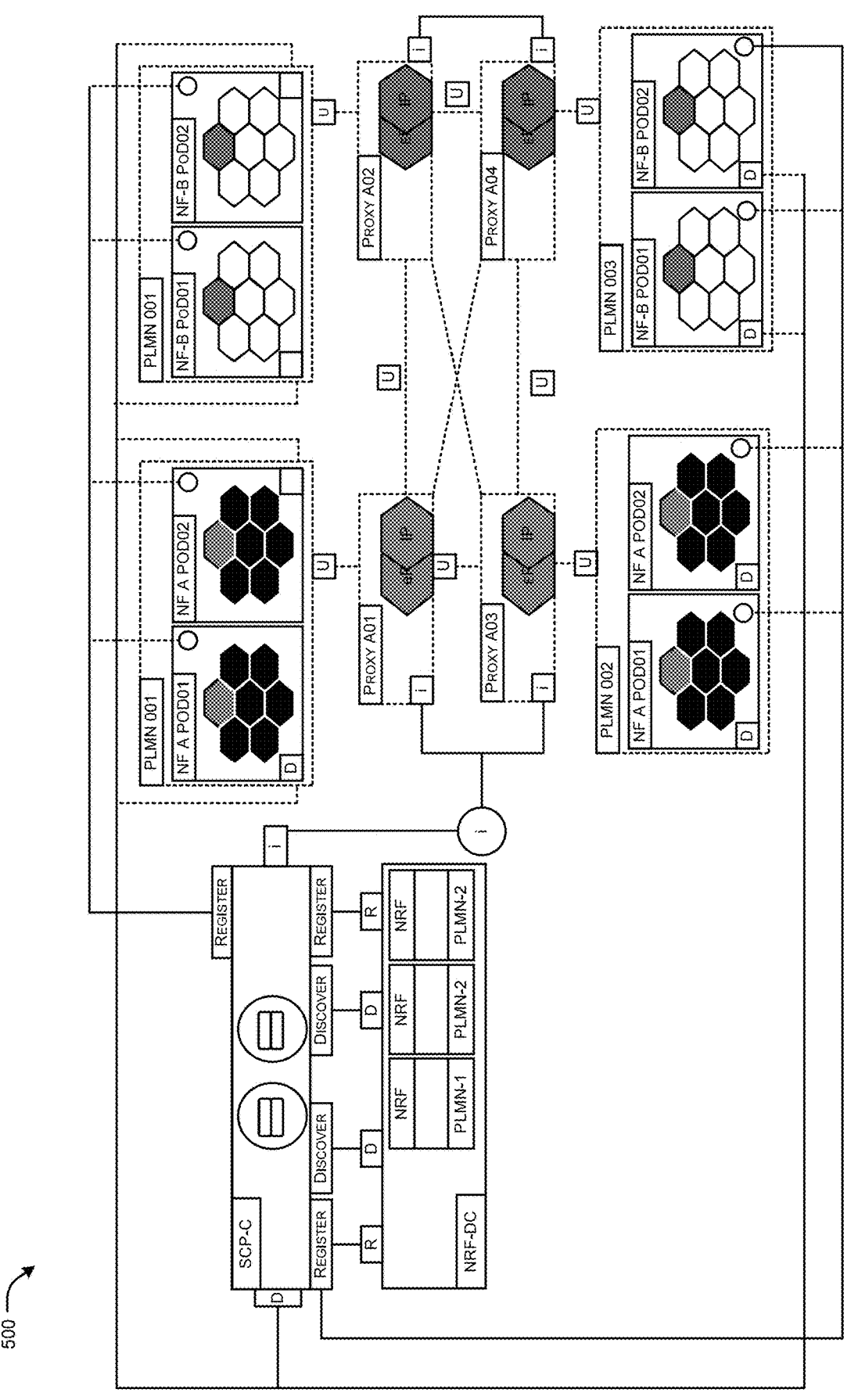
FIG. 5 illustrates an exemplary overview of SCP deployment based on the 5G functionality and SCP being deployed in independent deployment units, in accordance with an embodiment of the present disclosure.

FIG. 5 illustrates an exemplary overview of SCP deployment based on the 5G functionality and SCP being deployed in independent deployment units, in accordance with an embodiment of the present disclosure. Referring to FIG. 5, in 500, an overview of SCP deployment is illustrated, wherein the SCP deployment may be based on the 5G functionality and SCP may be deployed in independent deployment units. Further, the system 100 may be designed in a way that it may support:

One SCP Proxy instance for Single NF Type considered for one PLMN,

One SCP Proxy instance for Multiple NF Type considered for one PLMN,

One SCP Proxy instance for Multiple NF Type considered for multiple PLMN,

Multiple Proxies in Single PLMN for Multiple NF Types, and

Single SCP Controller for Multiple NRF instances considered for Multiple PLMN.

In an embodiment, the system 100 may be configured to provide different types of routing techniques for an SCP Proxy, where the routing techniques may be implemented as per requirement of different NF Team and their GR/DR handling. In one embodiment, ingress hybrid routing technique may be used at an ingress proxy whereas the egress hybrid routing technique may be used at an egress proxy. In these routing technique, GR or DR cluster may be defined based upon PLMN-list. In an example, the proposed hybrid routing technique may also be integrated with other policies, such as active-active routing policy, active standby routing policy, etc., which may ensure utilization of all endpoints in the active cluster first.

Figure 6:
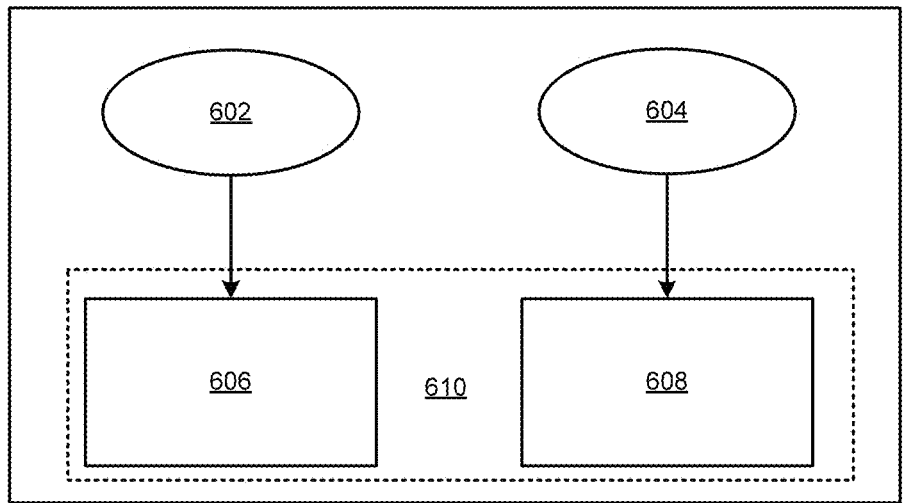
FIG. 6 illustrates an exemplary diagram representing hybrid specific traffic segregation, in accordance with an embodiment of the present disclosure.

Referring to FIG. 6, the system 100 can carry out hybrid traffic segregation through Network functions mapping between a primary site (not shown) and a Disaster Recovery (DR) site 610, which includes traffic from other sites, so that incase primary site is down, request can be routed to DR defined Network function. Also, the system 100 is capable of segregating traffic within a circle. Traffic for the same circle can be routed to one cluster, at 604, while traffic from other circles received as DR traffic can be handled by different cluster, at 602.

In an embodiment, in order to segregate traffic between two clusters, where one cluster will handle active traffic, at 608, while other cluster will handle DR traffic, at 608, the system 100 can replace PLMN list of DR cluster with some alias PLMN list. This configuration can be defined by the SCP controller as well as by the SCP proxy.

Figure 7A:
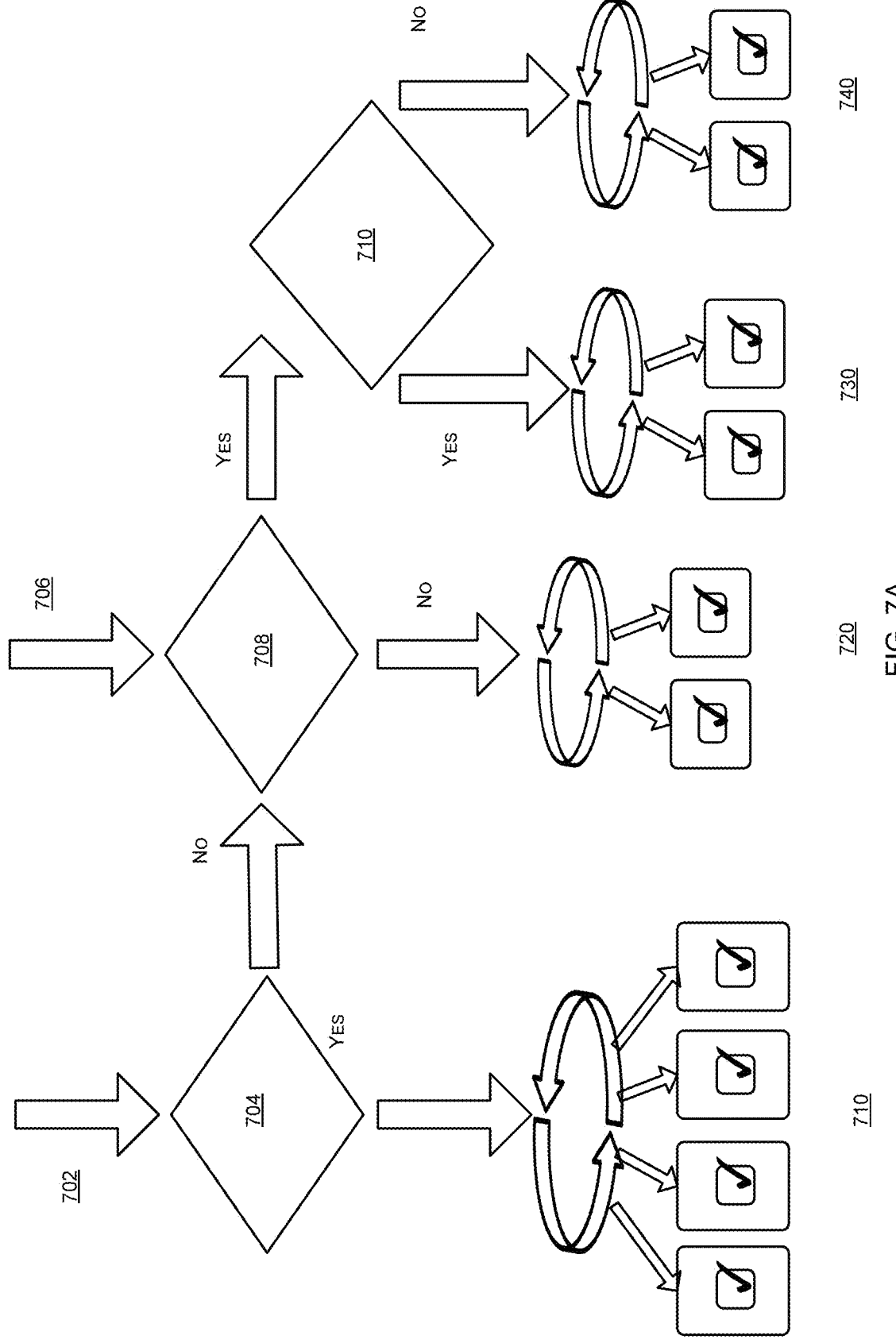
FIG. 7A illustrates an exemplary flow diagram representing hybrid specific primary secondary routing technique, in accordance with an embodiment of the present disclosure.

FIG. 7A illustrates an exemplary flow diagram representing hybrid specific primary secondary routing technique, wherein a request from other sites apart from a specific site, for example Nagpur, can be obtained at 702, and a request from Nagpur site can be obtained at 706. Then, it is checked at 704, whether any/at least one endpoint is active. If so, the obtained request can be transmitted and distributed at primary cluster 710. However, if none of the endpoint is found to be active, then at 708, it is checked whether the obtained request is from the Nagpur. If so, then it is checked again at 712, whether any/at least one endpoint is active.

In an embodiment, in case it is found, at the 708, the obtained request is not from Nagpur, then it is fed to Nagpur DR cluster 720.

In one embodiment, at the 712, if at least one endpoint is found to be active, then the obtained request is transmitted and distributed at Nagpur active cluster 730. However, at the 712, if none of the endpoint is found to be active, then the obtained request is fed to DR for Nagpur 740.

Figure 7B:
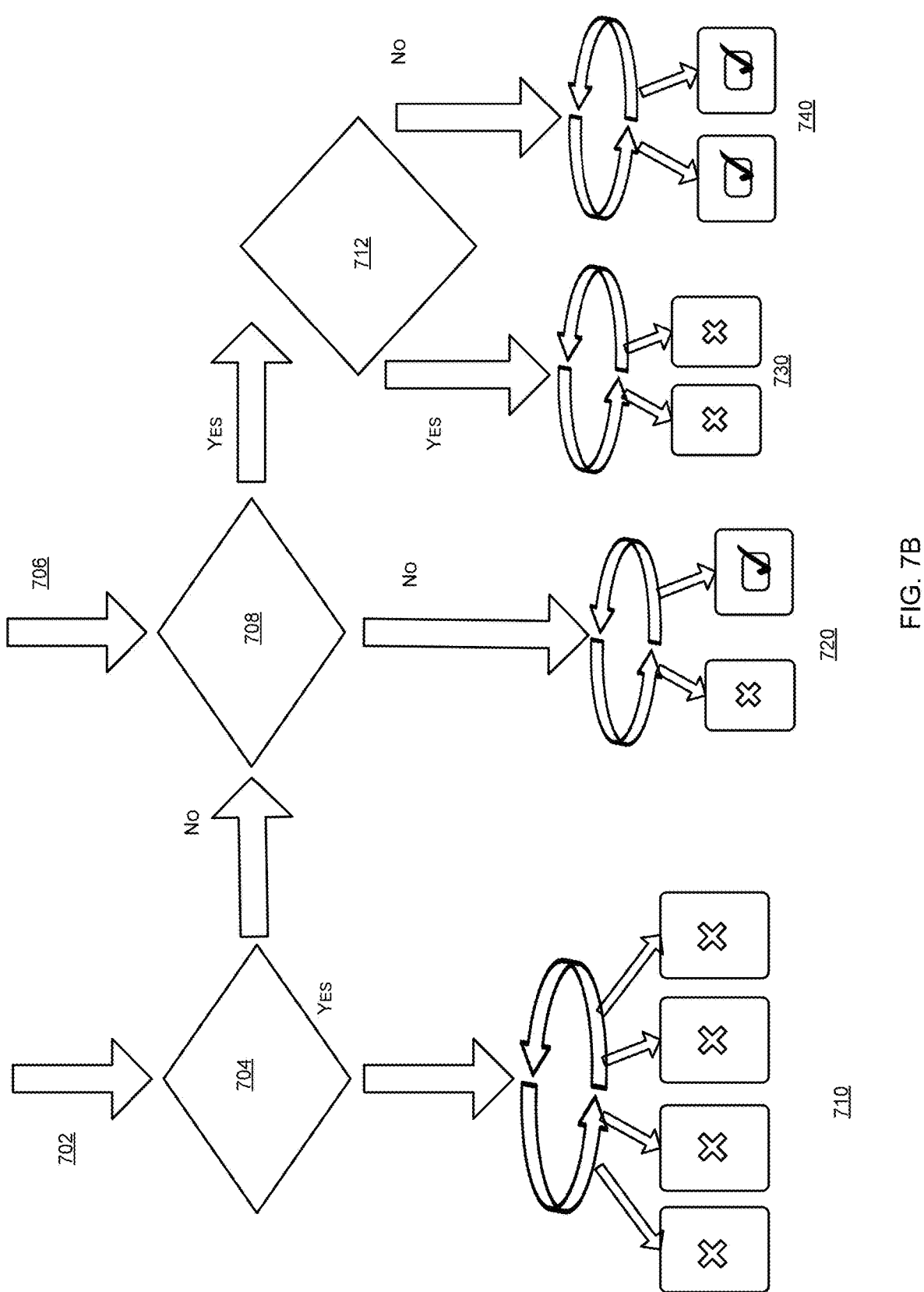
FIG. 7B with reference to FIG. 7A, illustrates functioning of the hybrid specific primary secondary routing technique when some clusters are down, in accordance with an embodiment of the present disclosure.

FIG. 7B with reference to FIG. 7A, illustrates functioning of the hybrid specific primary secondary routing technique when Nagpur active cluster is down.

In an embodiment, Hybrid routing protocols can use distance vectors for more accurate metrics to determine the best paths to destination networks, and report routing information only when there is a change in the topology of the network. Hybrid routing may also allow for rapid convergence but requires less processing power and memory as compared to link-state routing. Further, the proposed system 100 can resolve issues such as, but not limited to, congestion control, traffic prioritization, and overload control, and thereby can optimize the data path of the information exchanged between various network functions, thereby avoiding cases of data hampering, data loss, and data misplacement.

In an embodiment, the processor(s) or controller(s) 404 may pertain to an ingress controller to enable processing/controlling one or more aspects of received incoming request at an ingress node (entry point) of SCP 112. In another embodiment, the processor(s) or controller(s) 404 may pertain to an egress controller to enable processing/controlling one or more aspects of request that are being routed at an egress node (exit point) of SCP 112. In yet another embodiment, the processor(s) or controller(s) 404 may pertain to an integrated controller including both ingress and egress controllers to enable processing/controlling one or more aspects of received incoming request at an ingress node (entry point) of SCP 112 and/or to enable processing/controlling one or more aspects of request that are being routed at an egress node (exit point) of the SCP 112.

In an embodiment, the system 100 may be configured to provide different types of routing techniques for the SCP Proxy 402, where the routing techniques may be implemented as per the requirement of different NF Team and their GR/DR handling. In one embodiment, ingress hybrid routing technique may be used at an ingress proxy whereas the egress hybrid routing technique may be used at an egress proxy. In these routing technique, GR or DR cluster may be defined based upon PLMN-list. In an example, the proposed hybrid routing technique may also be integrated with other policies, which may ensure utilization of all endpoints in active cluster first.

Therefore, the proposed system 100 can resolve issues such as, but not limited to, congestion control, traffic prioritization, and overload control, and thereby can optimise the data path of the information exchanged between various network functions, thereby avoiding cases of data hampering, data loss, and data misplacement.

Figure 8:
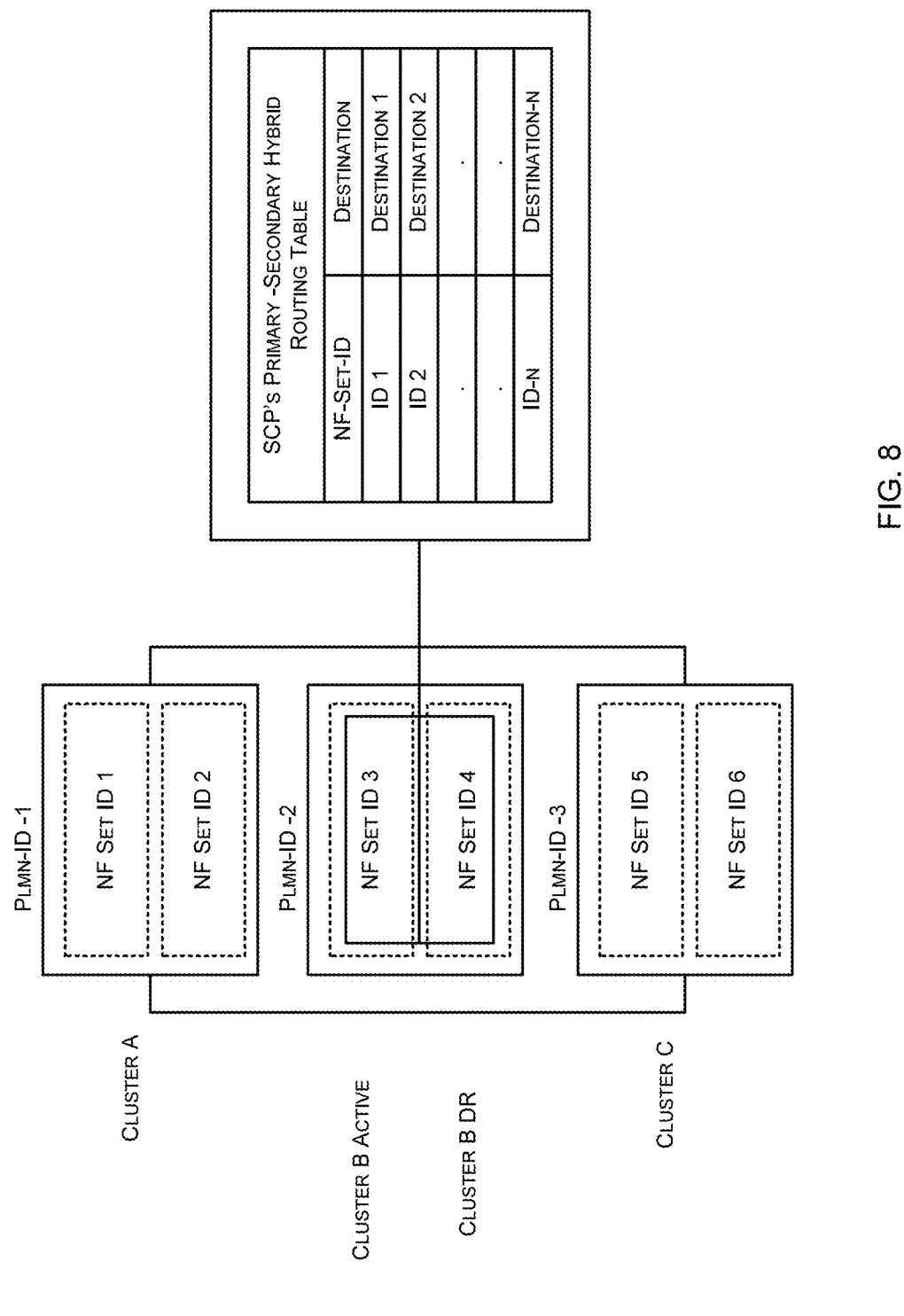
FIG. 8 illustrates exemplary representation showing various clusters associated with the hybrid routing, in accordance with an embodiment of the present disclosure

FIG. 8 illustrates exemplary representation pertaining to primary secondary hybrid routing, in accordance with an embodiment of the present disclosure. In an exemplary embodiment, three clusters namely cluster a, cluster B, and cluster C can be configured as either primary or secondary cluster on the basis of the illustrated hybrid specific primary secondary hybrid routing table. In an instance, the cluster B can act as active cluster independently as well as DR cluster for any or both of the cluster A and cluster C.

Figure 9:
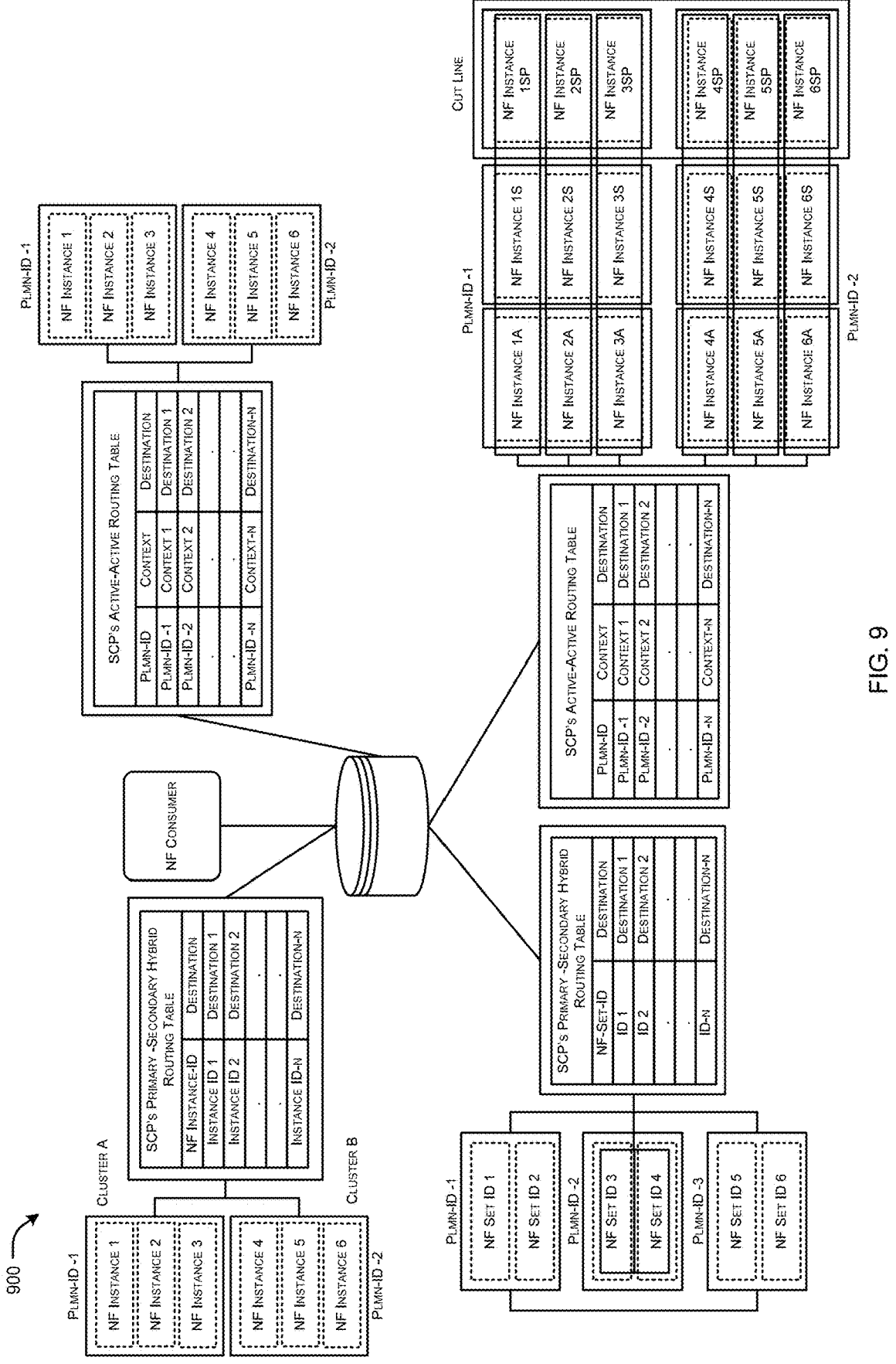
FIG. 9 illustrates exemplary representation showing an integrated implementation including various routing policies, in accordance with an embodiment of the present disclosure.

FIG. 9 illustrate exemplary representation showing an integrated implementation including various routing policies, in accordance with an embodiment of the present disclosure.

As shown in FIG. 9, for a consumer node, a system or SCP 112 may enable an integrated implementation includes various routing policies, which may be used for deciding a particular routing of request. For example, a table shows the routing based on the hybrid routing policy of SCP including routing between endpoints configured in active cluster and DR cluster, based on active and standby modes as described hereinabove. In another example, a table shows the routing based on active-active routing policy of SCP including routing between endpoints within an active cluster to ensure that all endpoints in the active cluster may be effectively utilized. In another example, a table shows the routing based on active-standby routing policy of SCP including routing between endpoints within primary and secondary clusters, wherein endpoints of active cluster may be paired with the endpoints of DR cluster such that if one endpoint of the active cluster is not available then the request is routed to corresponding paired endpoint of the DR cluster. In another example, a table shows the routing based on primary-secondary routing policy of SCP including routing between endpoints within primary and secondary clusters.

FIG. 10 illustrates an exemplary representation of flow diagram representing the proposed method 1000 for implementing hybrid routing technique in a network. The method 1000 can include collecting, at step 1002, at a controller in communication with one or more public land mobile network (PLMN) clusters associated with a network, a plurality of requests, from multiple source node devices, to be transmitted to the terminus node device.

In one embodiment, the method 1000 can include determining, at step 1004, at the controller, a source node device, for each of the plurality of requests being collected at the step 1002, along with correspondingly mapped primary PLMN cluster and secondary PLMN cluster among the one or more PLMN clusters.

In other embodiment, the method 1000 can include determining, at step 1006, at the controller, status of each end point of the pre-mapped primary PLMN cluster. Further, the method 1000 can include routing, at step 1008, routing, when the status of each end point of the pre-mapped primary PLMN cluster is determined to be inactive at the step 1006, the request through the pre-mapped secondary PLMN cluster for transmitting it to the terminus node device.

In an embodiment, in case a request is determined to be received from a first source node device, the method 1000 can include the steps of selecting a first PLMN cluster from the one or more PLMN clusters for transmitting said request, and then determining status of all endpoints of the first PLMN cluster, wherein the first PLMN cluster may be a pre-mapped primary PLMN cluster for the first source node device.

In another embodiment, when status of all the endpoints of the first PLMN cluster is determined to be inactive, the method 1000 can include the steps of selecting a second PLMN cluster from the one or more PLMN clusters, and then routing said request from the first PLMN cluster to the second PLMN cluster for transmitting said request to the terminus node device, wherein the second PLMN cluster may be a pre-mapped secondary PLMN cluster for the first source node device.

In an embodiment, if status of at least one of the endpoints of the first PLMN cluster is determined to be active, the method 1000 can include the step of transmitting said request directly through the first PLMN cluster to the terminus node device.

In other embodiment, when status of more than one end points of any of the first and second PLMN cluster is determined to be active, the method 1000 can include the step of distributing data traffic, pertaining to the requests among the plurality of requests associated with the first source node device, in the network proportionally among the active end points of said PLMN cluster.

According to another embodiment, in case a request is determined to be received from a source node device other than the first source node device, the method 1000 can include the step of selecting a third PLMN cluster from the one or more PLMN clusters for transmitting said request, and determining status of all endpoints of the third PLMN cluster, wherein the third PLMN cluster may be a pre-mapped primary PLMN cluster for said source node device.

Further, when status of all the endpoints of the third PLMN cluster is determined to be inactive, the method 1000 can include the step of selecting a fourth PLMN cluster from the one or more PLMN clusters, and routing said request from the third PLMN cluster to the fourth PLMN cluster for transmitting said request to the terminus node device, wherein the fourth PLMN cluster may be a pre-mapped secondary PLMN cluster for said source node device.

In an embodiment, if status of at least one of the endpoints of the third PLMN cluster is determined to be active, the method 1000 can include the step of transmitting said request directly through the third PLMN cluster to the terminus node device.

In one embodiment, the method 1000 can include the step of dividing a single PLMN cluster into two sub-clusters, wherein one of the two sub-clusters may act as the third PLMN cluster and the other may act as the fourth PLMN cluster.

In an embodiment, when status of more than one end points of any of the third and fourth PLMN cluster is determined to be active, the method 1000 can include the step of distributing data traffic, pertaining to the requests among the plurality of requests associated with the source node device other than the first source node device, in the network proportionally among the active end points of said PLMN cluster.

In another embodiment, the method 1000 can facilitate configuration of the one or more PLMN clusters as any of the primary PLMN cluster and the secondary PLMN cluster for multiple source node devices based on mapping of routing tables.

In yet another embodiment, in case status of all the end points of the secondary PLMN cluster is determined to be inactive, the method 1000 can include the step of triggering a negative response corresponding to said request.

FIG. 11 illustrates an exemplary computer system in which or with which embodiments of the present invention may be utilized in accordance with embodiments of the present disclosure.

As shown in FIG. 11, the computer system 1100 can include an external storage device 1110, a bus 1120, a main memory 1130, a read-only memory 1140, a mass storage device 1150, communication port 1160, and a processor 1170. A person skilled in the art will appreciate that the computer system may include more than one processor and communication ports. Processor 1170 may include various modules associated with embodiments of the present invention. Communication port 1160 can be any of an RS-232 port for use with a modem-based dialup connection, a 10/100 Ethernet port, a Gigabit, or 10 Gigabit port using copper or fiber, a serial port, a parallel port, or other existing or future ports. Communication port 1160 may be chosen depending on a network, such as a Local Area Network (LAN), Wide Area Network (WAN), or any network to which the computer system connects. Memory 1130 can be Random Access Memory (RAM), or any other dynamic storage device commonly known in the art. Read-only memory 1140 can be any static storage device(s) e.g., but not limited to, a Programmable Read-Only Memory (PROM) chips for storing static information e.g., start-up or BIOS instructions for the processor 1170. Mass storage 1150 may be any current or future mass storage solution, which can be used to store information and/or instructions.

Bus 1120 communicatively coupled processor(s) 1170 with the other memory, storage, and communication blocks. Bus 1120 can be, e.g., a Peripheral Component Interconnect (PCI)/PCI Extended (PCI-X) bus, Small Computer System Interface (SCSI), USB or the like, for connecting expansion cards, drives, and other subsystems as well as other buses, such a front side bus (FSB), which connects processor 1170 to a software system.

Optionally, operator and administrative interfaces, e.g., a display, keyboard, and a cursor control device, may also be coupled to the bus 1120 to support direct operator interaction with a computer system. Other operator and administrative interfaces can be provided through network connections connected through a communication port 1160. The components described above are meant only to exemplify various possibilities. In no way should the aforementioned exemplary computer system limit the scope of the present disclosure.

It would be appreciated that the embodiments herein are explained with respect to network device, however, the proposed system and method can be implemented in any computing device or external devices without departing from the scope of the invention.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art. ADVANTAGES OF THE PRESENT DISCLOSURE The present disclosure provides a system and method facilitating management of traffic pertaining to incoming requests by enabling effective and improved routing of the traffic.

The present disclosure provides a system and method that may be agnostic to architecture, structure, functionality of each node, and implementation of Network Functions.

The present disclosure provides a system and method that facilitates SCP implementation that enables load balancing, routing, traffic monitoring, congestion control, service discovery and other such functions in an effective manner.

ABBREVIATION TABLE

| Abbreviation | Full form |
| --- | --- |
| PSTN | Public Switched Telephone Network |
| PLMN | Public Land Mobile Network |
| SCP | Service Communication Proxy |
| DR | Disaster Recovery |
| AMF | Access and Mobility Management Function |
| NAS | Non-Access Stratum |
| SMF | Session Management Function |
| UE | User Equipment |
| UPF | User Plane Function |
| RAN | Radio Area Network |
| QoS | Quality of Service |
| DN | Data Network |
| PCF | Policy Control Function |
| ASF | Authentication Server Function |
| UDM | Unified Data Management |
| AF | Application Function |
| NEF | Network Exposure Function |
| NE | Network Function |
| NRF | NF Repository function |
| NSSF | Network Slice Selection Function |
| UDR | Unified Data Repository |
| AKA | Authentication and Key Agreement |
| NWDAF | Network Data Analytics Function |

-continued

ABBREVIATION TABLE

| Abbreviation | Full form |
| --- | --- |
| SMSF | Short Message Service Function |
| SEPP | Security Edge Protection Proxy |
| SMSC | Short Message Service Centre |
| VPLMN | Visiting Public Land Mobile Network |
| HPLMN | Home Public Land Mobile Network |

We claim:

1. A system (100) for enabling hybrid routing in a network, the system (100) comprising:

a controller (102) in communication with one or more public land mobile network (PLMN) clusters, a plurality of source node devices, and a terminus node device associated with the network, the controller (102) comprising one or more processors coupled to a memory storing instructions executable by the one or more processors, the controller (102) configured to:

collect, from multiple source node devices in communication with the controller, a plurality of requests to be transmitted to the terminus node device;

determine, for each of the plurality of requests, a source node device along with a correspondingly pre-mapped primary PLMN cluster and secondary PLMN cluster among the one or more PLMN clusters;

determine status of each end point of the pre-mapped primary PLMN cluster; and route, when the status of each end point of the pre-mapped primary PLMN cluster is determined to be inactive, the request through the pre-mapped secondary PLMN cluster for transmitting it to the terminus node device.

2. The system (100) as claimed in claim 1, wherein in case a request is determined to be received from a first source node device (108-1), the controller (102) is further configured to select a first PLMN cluster from the one or more PLMN clusters for transmitting said request, and determine status of all endpoints of the first PLMN cluster, wherein the first PLMN cluster is a pre-mapped primary PLMN cluster for the first source node device (108-1);

wherein, when status of all the endpoints of the first PLMN cluster is determined to be inactive, the controller (102) is configured to select a second PLMN cluster from the one or more PLMN clusters, and route said request to the second PLMN cluster for transmitting said request to the terminus node device (108-N), wherein the second PLMN cluster is a pre-mapped secondary PLMN cluster for the source node device (108-1).

3. The system (100) as claimed in claim 2, wherein if status of at least one of the endpoints of the first PLMN cluster is determined to be active, the controller (102) is further configured to transmit said request directly through the first PLMN cluster to the terminus node device (108-N).

4. The system (100) as claimed in claim 2, wherein when status of more than one end points of any of the first and second PLMN cluster is determined to be active, the controller (102) is further configured to distribute data traffic, pertaining to the requests among the plurality of requests associated with the first source node device (108-1), in the network proportionally among the active end points of said PLMN cluster.

5. The system (100) as claimed in claim 4, wherein the controller (102) is configured to replace the second PLMN cluster with another PLMN cluster when the second PLMN cluster handles disaster recovery traffic, and wherein the configuration is defined at a service communication proxy (SCP) controller and/or SCP proxy.

6. The system (100) as claimed in claim 2, wherein in case a request is determined to be received from a source node device other than the first source node device (108-2), the controller (102) is further configured to select a third PLMN cluster from the one or more PLMN clusters for transmitting said request, and determine status of all endpoints of the third PLMN cluster, wherein the third PLMN cluster is a pre-mapped primary PLMN cluster for said source node device (108-2), and wherein, when status of all the endpoints of the third PLMN cluster is determined to be inactive, the controller (102) is further configured to select a fourth PLMN cluster from the one or more PLMN clusters, and route said request from the third PLMN cluster to the fourth PLMN cluster for transmitting said request to the terminus node device, wherein the fourth PLMN cluster is a pre-mapped secondary PLMN cluster for said source node device (108-2).

7. The system (100) as claimed in claim 5, if status of at least one of the endpoints of the third PLMN cluster is determined to be active, the controller (102) is further configured to transmit said request directly through the third PLMN cluster to the terminus node device.

8. The system (100) as claimed in claim 5, wherein the controller (102) is configured to divide a single PLMN cluster of the one or more PLMN clusters into two sub-clusters, wherein one of the two sub-clusters acts as the third PLMN cluster and the other sub-cluster acts as the fourth PLMN cluster.

9. The system (100) as claimed in claim 5, wherein when status of more than one end points of any of the third and fourth PLMN cluster is determined to be active, the controller (102) is further configured to distribute data traffic, pertaining to the requests among the plurality of requests associated with the source node device other than the first source node device (108-2), in the network proportionally among the active end points of said PLMN cluster.

10. The system (100) as claimed in claim 5, wherein the controller (102) is further configured to facilitate configuration of the one or more PLMN clusters as any of the primary PLMN cluster and the secondary PLMN cluster for multiple source node devices based on mapping of routing tables.

11. The system (100) as claimed in claim 5, wherein in case status of all the end points of the secondary PLMN cluster is determined to be inactive, the controller (102) is further configured to trigger a negative response corresponding to said request.

12. A method (1000) for enabling hybrid routing in a network, the method (1000) comprising the steps of:

collecting (1002), at a controller in communication with one or more public land mobile network (PLMN) clusters associated with the network, a plurality of requests, from multiple source node devices, to be transmitted to the terminus node device;

determining (1004), at the controller, a source node device, for each of the plurality of requests, along with a correspondingly pre-mapped primary PLMN cluster and secondary PLMN cluster among the one or more PLMN clusters;

determining (1006), at the controller, status of each end point of the pre-mapped primary PLMN cluster; and routing (1008), when the status of each end point of the pre-mapped primary PLMN cluster is determined to be inactive, the request through the pre-mapped secondary PLMN cluster for transmitting it to at least one of the one or more terminus node device.

13. The method (1000) as claimed in claim 11, wherein in case a request is determined to be received from a first source node device, the method (1000) comprises the steps of selecting a first PLMN cluster from the one or more PLMN clusters for transmitting said request, and then determining status of all endpoints of the first PLMN cluster, wherein the first PLMN cluster is a pre-mapped primary PLMN cluster for the first source node device;

wherein, when status of all the endpoints of the first PLMN cluster is determined to be inactive, the method (1000) comprises the steps of selecting a second PLMN cluster from the one or more PLMN clusters, and then routing said request from the first PLMN cluster to the second PLMN cluster for transmitting said request to the terminus node device, wherein the second PLMN cluster is a pre-mapped secondary PLMN cluster for the first PLMN cluster.

14. The method (1000) as claimed in claim 12, wherein if status of at least one of the endpoints of the first PLMN cluster is determined to be active, the method (1000) further comprises the step of transmitting said request directly through the first PLMN cluster to the terminus node device.

15. The method (1000) as claimed in claim 12, wherein when status of more than one end points of any of the first and second PLMN cluster is determined to be active, the method (1000) comprises the step of distributing data traffic, pertaining to the requests among the plurality of requests associated with the first source node device, in the network proportionally among the active end points of said PLMN cluster.

16. The method (1000) as claimed in claim 12, wherein in case a request is determined to be received from a source node device other than the first source node device, the method (1000) comprises the step of selecting a third PLMN cluster from the one or more PLMN clusters for transmitting said request, and determining status of all endpoints of the third PLMN cluster, wherein the third PLMN cluster is pre-mapped primary PLMN cluster for said source node device, and wherein, when status of all the endpoints of the third PLMN cluster is determined to be inactive, the method (1000) comprises the step of selecting a fourth PLMN cluster from the one or more PLMN clusters, and routing said request from the third PLMN cluster to the fourth PLMN cluster for transmitting said request to the terminus node device, wherein the fourth PLMN cluster is a pre-mapped secondary PLMN cluster for said source node device.

17. The method (1000) as claimed in claim 15, wherein if status of at least one of the endpoints of the third PLMN cluster is determined to be active, the method (1000) comprises the step of transmitting said request directly through the third PLMN cluster to the terminus node device.

18. The method (1000) as claimed in claim 15, wherein the method (1000) comprises the step of dividing a single PLMN cluster into two sub-clusters, wherein one of the two sub-clusters acts as the third PLMN cluster and the other sub-cluster acts as the fourth PLMN cluster.

19. The method (1000) as claimed in claim 15, wherein when status of more than one end points of any of the third and fourth PLMN cluster is determined to be active, the method (1000) comprises the step of distributing data traffic, pertaining to the requests among the plurality of requests associated with the source node device other than the first source node device, in the network proportionally among the active end points of said PLMN cluster.

20. The method (1000) as claimed in claim 15, wherein the method (1000) facilitates configuration of the one or more PLMN clusters as any of the primary PLMN cluster and the secondary PLMN cluster for multiple source node devices based on mapping of routing tables.

21. The method (1000) as claimed in claim 15, wherein in case status of all the end points of the secondary PLMN cluster is determined to be inactive, the method (1000) comprises the step of triggering a negative response corresponding to said request.

22. A non-transitory computer readable medium comprising machine executable instructions that are executable by a processor to:

collect, from multiple source node devices in communication with the controller, a plurality of requests to be transmitted to the terminus node device;

determine, for each of the plurality of requests, a source node device along with a correspondingly pre-mapped primary PLMN cluster and secondary PLMN cluster among the one or more PLMN clusters;

determine status of each end point of the pre-mapped primary PLMN cluster; and route, when the status of each end point of the pre-mapped primary PLMN cluster is determined to be inactive, the request through the pre-mapped secondary PLMN cluster for transmitting it to the terminus node device.

* * * * *